(12) United States Patent
Southward

(10) Patent No.: US 7,093,504 B2
(45) Date of Patent: Aug. 22, 2006

(54) METHOD AND SYSTEM FOR MEASURING TORQUE

(75) Inventor: Steve C. Southward, Apex, NC (US)

(73) Assignee: LORD Corporation, Cary, NC (US)

( * ) Notice: Subject to any disclaimer, the term of this patent is extended or adjusted under 35 U.S.C. 154(b) by 0 days.

(21) Appl. No.: 10/928,340

(22) Filed: Aug. 27, 2004

(65) Prior Publication Data
US 2005/0044968 A1    Mar. 3, 2005

Related U.S. Application Data

(60) Provisional application No. 60/499,249, filed on Aug. 29, 2003.

(51) Int. Cl.
*G01L 3/00* (2006.01)

(52) U.S. Cl. .................................. 73/862.08

(58) Field of Classification Search .............. 73/862.08
See application file for complete search history.

(56) References Cited

U.S. PATENT DOCUMENTS

| | | |
|---|---|---|
| 3,548,649 A | 12/1970 | Parkinson |
| 3,824,848 A | 7/1974 | Parkinson |
| 3,876,326 A | 4/1975 | Weitz |
| 4,488,443 A | 12/1984 | Parkinson |
| 4,765,434 A * | 8/1988 | Kawamoto et al. .... 73/862.324 |
| 5,182,953 A | 2/1993 | Ellinger et al. |
| 5,192,862 A | 3/1993 | Rudd, III |
| 5,228,349 A | 7/1993 | Gee et al. |
| 5,456,123 A | 10/1995 | Parkinson |
| 5,474,813 A | 12/1995 | Walker et al. |
| 5,508,609 A | 4/1996 | Parkinson et al. |
| 5,514,952 A | 5/1996 | Parkinson |
| 5,734,108 A | 3/1998 | Walker et al. |
| 5,969,269 A | 10/1999 | Munyon et al. |
| 6,295,879 B1 | 10/2001 | Miller et al. |
| 6,467,360 B1 | 10/2002 | Bogdanov |
| 6,782,766 B1 | 8/2004 | Parkinson |

FOREIGN PATENT DOCUMENTS

| | | |
|---|---|---|
| EP | 0632250 A1 | 1/1995 |
| GB | 1498471 | 10/1975 |
| WO | WO 99/05493 | 2/1999 |

OTHER PUBLICATIONS

Torque Transducers, Hottinger Baldwin Messtechnik, Germany, pp. 1-12, 2004.

* cited by examiner

*Primary Examiner*—Max Noori
(74) *Attorney, Agent, or Firm*—Edward F. Murphy, III

(57) ABSTRACT

The invention provides a method/system for measuring torque. The method/system includes providing a first rotating disk having a target pattern and providing a second rotating disk having a target pattern. The method/system includes providing a first set of at least three sensors, comprised of a first disk first sensor, a first disk second sensor, and a first disk third sensor, the first set of at least three sensors for sensing the first rotating disk target pattern with the first set of at least three sensors fixed around and encompassing the first rotating disk. The method/system includes providing a second set of at least three sensors, comprised of a second disk first sensor, a second disk second sensor, and a second disk third sensor, the second set of at least three sensors for sensing the second rotating disk target pattern, with the second set of at least three sensors fixed around and encompassing the second rotating disk. The method/system includes measuring an apparent twist of the first rotating disk relative to the second rotating disk with the first set of at least three sensors and the second set of at least three sensors, and determining an actual twist angle from the measured apparent twist.

10 Claims, 12 Drawing Sheets

METHOD AND SYSTEM FOR MEASURING TORQUE

CROSS REFERENCE

This application claims the benefit of, and incorporates by reference, U.S. Provisional Patent Application No. 60/499,249 filed on Aug. 29, 2003.

This invention was made with government support under contract N00019-02-C-3003, awarded by the United States Department of Defense. The United States Government may have certain rights in this invention.

FIELD OF THE INVENTION

The present invention relates to methods and systems for monitoring and measuring torque. More particularly the invention relates to a method/system for measuring torque in a rotating drive shaft system, particularly measuring torque of a rotating drive shaft coupling in a fixed wing aircraft vehicle propulsion system.

BACKGROUND OF THE INVENTION

There is a need for a system and method of accurately and economically measuring torque in a high speed rotating shaft system. There is a need for an economically feasible method of dynamically measuring torque in a high speed rotating shaft system. There is a need for a robust system and method of measuring torque of a rotating drive shaft coupling in the propulsion system of a fixed wing vertical short take off and landing aircraft vehicle, such as for monitoring a fixed wing vertical short take off and landing aircraft vehicle rotating drive shaft propulsion system flexible coupling.

SUMMARY OF THE INVENTION

The invention includes a method of measuring torque. The method includes providing a first rotating disk A having a target pattern and providing a second rotating disk B having a target pattern. The method includes providing a first set of at least three sensors, comprised of a first disk first sensor ($T_{1A}$), a first disk second sensor ($T_{2A}$), and a first disk third sensor ($T_{3A}$), the first set of at least three sensors for sensing the first rotating disk target pattern with the first set of at least three sensors fixed around and encompassing the first rotating disk. The method includes providing a second set of at least three sensors, comprised of a second disk first sensor ($T_{1B}$), a second disk second sensor ($T_{2B}$), and a second disk third sensor ($T_{3B}$), the second set of at least three sensors for sensing the second rotating disk target pattern, with the second set of at least three sensors fixed around and encompassing the second rotating disk. The method includes measuring an apparent twist of the first rotating disk relative to the second rotating disk with the first set of at least three sensors and the second set of at least three sensors, and determining an actual twist angle from the measured apparent twist.

The invention includes a torque measurement system. The torque measurement system is comprised of a first rotating Disk A rotating about a first rotating disk center z-axis with the first disk oriented in an x-y plane, with the first rotating Disk A having a target pattern. The torque measurement system is comprised of a second rotating Disk B rotating about a second rotating disk center z-axis with the second disk oriented in an x-y plane, with the second rotating Disk B having a target pattern. The torque measurement system includes a sensor cradle centered around a sensor cradle reference z-axis, the sensor cradle encompassing the first rotating disk and the second rotating disk with a first disk first sensor ($T_{1A}$), a first disk second sensor ($T_{2A}$), a first disk third sensor ($T_{3A}$), with the first disk first sensor ($T_{1A}$), the first disk second sensor ($T_{2A}$), and the first disk third sensor ($T_{3A}$), fixed around and encompassing the first rotating disk and positioned for sensing the first rotating disk target pattern. The sensor cradle includes a second disk first sensor ($T_{1B}$), a second disk second sensor ($T_{2B}$), a second disk third sensor ($T_{3B}$), with the second disk first sensor ($T_{1B}$), the second disk second sensor ($T_{2B}$), and the second disk third sensor ($T_{3B}$) fixed around and encompassing the second rotating disk and positioned for sensing the second rotating disk target pattern. The first disk first sensor ($T_{1A}$) is positioned adjacent the second disk first sensor ($T_{1B}$), the first disk second sensor ($T_{2A}$), is positioned adjacent the second disk second sensor ($T_{2B}$), and the first disk third sensor ($T_{3A}$), is positioned adjacent the second disk third sensor ($T_{3B}$) with the sensors positioned to sense a $\Delta x$ offset and a $\Delta y$ offset of the first rotating disk center z-axis from the sensor cradle reference z-axis and a $\Delta x$ offset and a $\Delta y$ offset of the second rotating disk center z-axis from the sensor cradle reference z-axis to provide for determination of an actual twist angle $\theta_{twist}$ between the first rotating Disk A and the second rotating Disk B.

The invention includes a torque shaft misalignment measurement system. The torque shaft misalignment measurement system includes a first rotating disk and shaft rotating about a first rotating center z-axis with the first disk oriented in an x-y plane. The first rotating Disk A has a perimeter target pattern. The torque shaft misalignment measurement system includes a second rotating disk and shaft rotating about a second rotating center z-axis with the second disk oriented in an x-y plane. The second rotating Disk B has a perimeter target pattern. The first rotating shaft and the second rotating shaft are coupled together with a center of rotation between the first rotating disk and the second rotating disk. The torque shaft misalignment measurement system includes a sensor cradle centered around a sensor cradle reference z-axis, the sensor cradle encompassing the first rotating disk and the second rotating disk with a first disk first sensor ($T_{1A}$), a first disk second sensor ($T_{2A}$), a first disk third sensor ($T_{3A}$), with the first disk first sensor ($T_{1A}$), the first disk second sensor ($T_{2A}$), and the first disk third sensor ($T_{3A}$) fixed around and encompassing the first rotating disk and positioned for sensing the first rotating disk target pattern. The sensor cradle includes a second disk first sensor ($T_{1B}$), a second disk second sensor ($T_{2B}$), a second disk third sensor ($T_{3B}$), with the second disk first sensor ($T_{1B}$), the second disk second sensor ($T_{2B}$), and the second disk third sensor ($T_{3B}$) fixed around and encompassing the second rotating disk and positioned for sensing the second rotating disk target pattern. The first disk first sensor ($T_{1A}$), is positioned adjacent the second disk first sensor ($T_{1B}$), the first disk second sensor ($T_{2A}$), positioned adjacent the second disk second sensor ($T_{2B}$), and the first disk third sensor ($T_{3A}$) positioned adjacent the second disk third sensor ($T_{3B}$) with the sensors positioned to sense a $\Delta x$ offset and a $\Delta y$ offset of the first rotating disk center z-axis from the sensor cradle reference z-axis and a $\Delta x$ offset and a $\Delta y$ offset of the second rotating disk center z-axis from the sensor cradle reference z-axis to provide for determination of an actual twist angle $\theta_{twist}$ between the first rotating Disk A and the second rotating Disk B and an incremental offset between the first rotating center z-axis and the second rotating center z-axis at the center of rotation.

The invention includes a method of measuring a twist angle. The method includes providing a first rotating Disk A having a target pattern and providing a second rotating Disk B having a target pattern. The method includes providing a first set of at least three sensors comprised of a first disk first sensor ($T_{1A}$), a first disk second sensor ($T_{2A}$), a first disk third sensor ($T_{3A}$), the first set of at least three sensors for sensing the first rotating disk target pattern with first set of at least three sensors fixed around and encompassing the first rotating disk. The method includes providing a second set of at least three sensors, the second set comprised of a second disk first sensor ($T_{1B}$), a second disk second sensor ($T_{2B}$), a second disk third sensor ($T_{3B}$), the second set of at least three sensors for sensing the second rotating disk target pattern with the second set of at least three sensors fixed around and encompassing the second rotating disk. The method includes measuring an apparent twist of the first rotating disk relative to the second rotating disk with the first set of at least three sensors and the second set of at least three sensors, and determining an actual twist angle $\theta_{twist}$ from the measured apparent twist.

The invention includes a twist angle measurement system. The twist angle measurement system includes a first rotating Disk A rotating about a first rotating disk center z-axis with the first disk oriented in an x-y plane, the first rotating Disk A having a target pattern. The twist angle measurement system includes a second rotating Disk B rotating about a second rotating disk center z-axis with the second disk oriented in an x-y plane, the second rotating Disk B having a target pattern. The twist angle measurement system includes a sensor cradle centered around a sensor cradle reference z-axis, the sensor cradle encompassing the first rotating disk and the second rotating disk with a first disk first sensor ($T_{1A}$), a first disk second sensor ($T_{2A}$), a first disk third sensor ($T_{3A}$), the first disk first sensor ($T_{1A}$), the first disk second sensor ($T_{2A}$), and the first disk third sensor ($T_{3A}$) fixed around and encompassing said first rotating disk and positioned for sensing the first rotating disk target pattern. The sensor cradle includes a second disk first sensor ($T_{1B}$), a second disk second sensor ($T_{2B}$), a second disk third sensor ($T_{3B}$), the second disk first sensor ($T_{1B}$), the second disk second sensor ($T_{2B}$), and the second disk third sensor ($T_{3B}$), fixed around and encompassing the second rotating disk and positioned for sensing the second rotating disk target pattern. The first disk first sensor ($T_{1A}$) positioned adjacent the second disk first sensor ($T_{1B}$), the first disk second sensor ($T_{2A}$) positioned adjacent the second disk second sensor ($T_{2B}$), and the first disk third sensor ($T_{3A}$) positioned adjacent the second disk third sensor ($T_{3B}$) with the sensors positioned to sense a $\Delta x$ offset and a $\Delta y$ offset of the first rotating disk center z-axis from the sensor cradle reference z-axis and a $\Delta x$ offset and a $\Delta y$ offset of the second rotating disk center z-axis from the sensor cradle reference z-axis to provide for determination of an actual twist angle $\theta_{twist}$ between the first rotating Disk A and the second rotating Disk B.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

DETAILED DESCRIPTION

Figure 1:
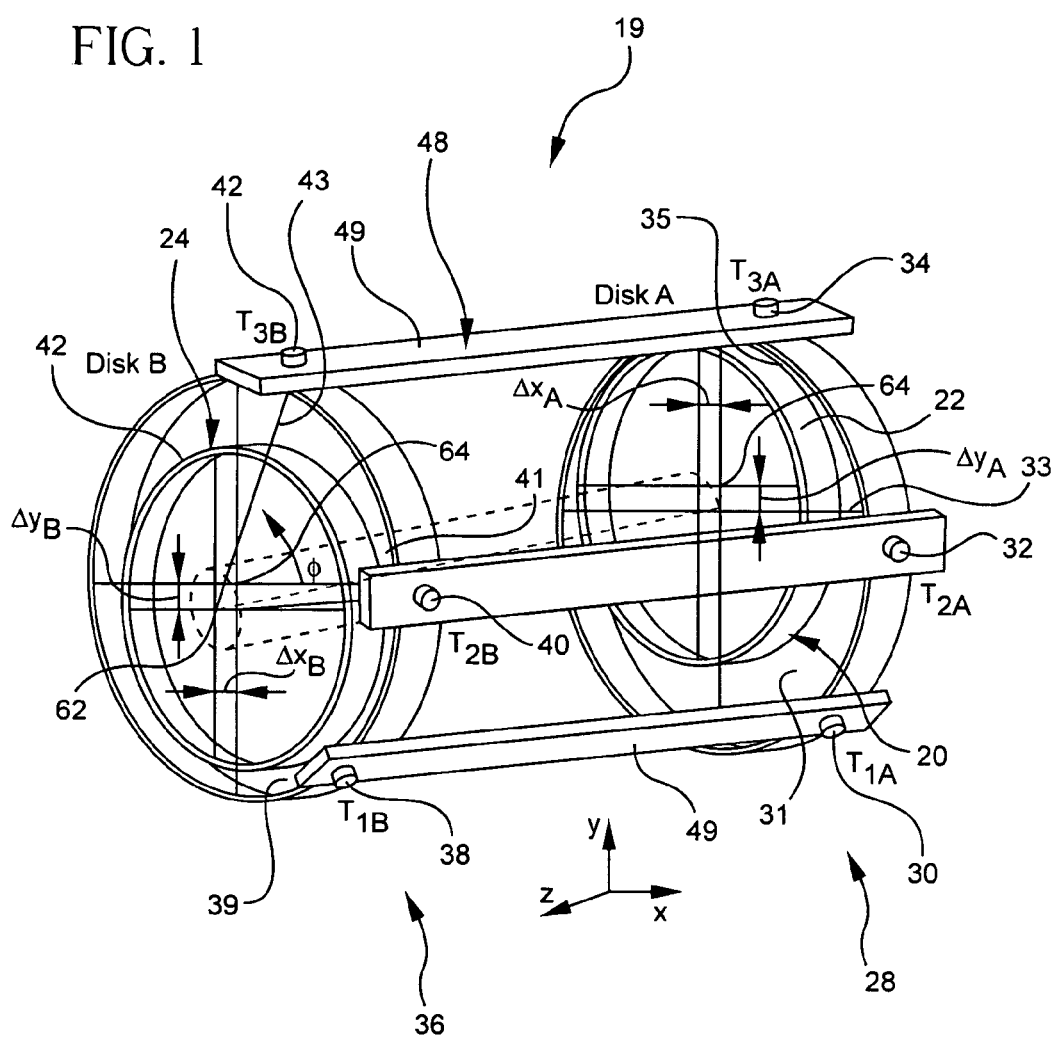
FIG. 1 shows an embodiment of the invention.

Reference will now be made in detail to the present preferred embodiments of the invention, examples of which are illustrated in the accompanying drawings.

The invention includes a method of measuring torque. The method includes providing a first rotating disk 20 (Disk A) having a target pattern 22, providing a second rotating disk 24 (Disk B) having a target pattern 26, providing a first set of at least three sensors 28, the first set 28 comprised of a first disk first sensor 30 ($T_{1A}$), a first disk second sensor 32 ($T_{2A}$), a first disk third sensor 34 ($T_{3A}$), this first set of at least three sensors for simultaneously sensing the first rotating disk target pattern 22 with this first set 28 of at least three sensors fixed around and encompassing the first rotating disk 20. The method includes providing a second set of at least three sensors 36 comprised of a second disk first sensor 38 ($T_{1B}$), a second disk second sensor 40 ($T_{2B}$), a second disk third sensor 42 ($T_{3B}$). The second sensor set 36 for simultaneously sensing the second rotating disk target pattern 26 with the second sensor set 36 fixed around and encompassing the second rotating disk 24. Preferably the method includes determining an instantaneous spinning shaft speed 44 of the disks from the first, second or both disks. Preferably the method includes measuring incremental lateral and angular displacements of the first disk 20 relative to first set of sensors 28 and the second disk 24 relative to second set of sensors 36. Preferably the disk 20 (Disk A) incremental and lateral displacement measurements are computed from relative timing measurements between the sensors 30, 32, 34 sensing Disk A. Preferably the disk 24 (Disk B) incremental and lateral displacement measurements are computed from relative timing measurements between the sensors 38, 40, 42 sensing Disk B. The method includes measuring an apparent twist of the first rotating disk 20 relative to the second rotating disk 24 with the first set of at least three sensors 28 and the second set of at least three sensors 36. Preferably the apparent twist measurements are computed from relative timing measurements between the sensors sensing Disk A and Disk B. The method includes determining an actual twist angle $\theta_{twist}$ from the measured apparent twist, preferably with the measured incremental lateral and angular displacements and positional displacement of Disk A and B. Preferably the method includes providing a measurement of torque from the actual twist angle using a determined coupling compliance to compute torque, with torque of the coupling 50 correlated with the actual twist angle of the coupling 50. Preferably the method includes compensating for a lateral displacement of the first rotating disk 20 (Disk A) and a lateral displacement of the second rotating disk 24 (Disk B). Preferably by measuring an incremental lateral and angular displacements of first disk 20 relative to the first set of sensors 28 and the second disk 24 relative to the second set of sensors 36 and using these measurements to determine the measured incremental lateral and angular displacements. Preferably providing the first set of sensors 28 includes providing a sensor cradle 48 with the first disk first sensor 30 ($T_{1A}$) separated from the first disk 20 with a sensor gap 31, the first disk second sensor 32 ($T_{2A}$) separated from the first disk 20 with a sensor gap 33, the first disk third sensor 34 ($T_{3A}$) separated from the first disk 20 with a sensor gap 35, and the method including compensating for a variation in the gap 31 between first disk first sensor 30 and the first disk 20, a variation in the gap 33 between the first disk second sensor 32 and the first disk 20, and a variation in the gap 35 between the first disk third sensor 34 and the first disk 20. Preferably providing the second set of sensors 36 includes providing a sensor cradle 48 with the second disk first sensor 38 ($T_{1B}$) separated from the second disk 24 with a sensor gap 39, the second disk second sensor 40 ($T_{2B}$) separated from the second disk 24 with a sensor gap 41, the second disk third sensor 42 ($T_{3B}$) separated from the second disk 24 with a sensor gap 43, and the method including compensating for a variation in the sensor gap between the second disk first sensor 38 and the second disk 24, a variation in the sensor gap between the second disk second sensor 40 and the second disk 24, and a variation in the gap sensor between the second disk third sensor 42 and the second disk 24. Preferably the method including providing a sensor cradle 48 for circumferentially fixing the position of the first set of at least three sensors 28 and the second set of at least three sensors 36, with the first disk first sensor 30 ($T_{1A}$) positioned adjacent and aligned with the second disk first sensor 38($T_{1B}$), the first disk second sensor 32 ($T_{2A}$) positioned adjacent and aligned with the second disk second sensor 40 ($T_{2B}$), and the first disk third sensor 34 ($T_{3A}$), positioned adjacent and aligned with the second disk third sensor 42 ($T_{3B}$), preferably the first disk first sensor 30 and the second disk first sensor 38 are axially aligned, the first disk second sensor 32 and the second disk second sensor 40 are axially aligned, and the first disk third sensor 34 and the second disk third sensor 42 are axially aligned. Most preferably the axially aligned first disk first sensor 30 and the second disk first sensor 38, the axially aligned first disk second sensor 32 and the second disk second sensor 40, and the axially aligned first disk third sensor 34 and the second disk third sensor 42 are in parallel alignment with the alignment oriented with the rotation axis of the disks 20 and 24. Preferably the method including compensating for the gap variations between a disk sensor and a disk (sensor gap variation between sensor $T_{nB}$ and Disk B; sensor gap variation between sensor $T_{nA}$ and Disk A) (n=1, 2, 3 . . . ). Preferably providing the first rotating disk 20 includes providing the first rotating disk 20 with a first rotating shaft 52 and providing the second rotating disk 24 includes providing the second rotating disk with a second rotating shaft 54 with the first rotating shaft 52 and the second rotating shaft 54 flexibly coupled together with a center of rotation 56 between the first rotating disk 20 and the second rotating disk 24, and the method includes determining an angular misalignment between the first rotating shaft 52 and the second rotating shaft 54, preferably by measuring and determining misalignment between the disks 20, 24 to provide the shaft misalignment. Preferably providing the first rotating disk 20 having a target pattern 22 comprises providing the first rotating disk 20 having a periodic perimeter target pattern 22 comprised of multiple targets 23 fixedly distributed around the circumference of disk 20. In an embodiment the target pattern 22 has uniform spacing. In an embodiment the target pattern 22 has nonuniform spacing. Preferably the pattern target members 23 have parallel sensible lines 21 with target shape members 23 aligned with the disk rotation axis, with the sensed target line edges 21 normal to the disk edge, preferably with such lines 21 parallel and normal compared to being slanted. Preferably providing the second rotating disk 24 having a target pattern 26 comprises providing the second rotating disk 24 having a periodic perimeter target pattern 26 comprised of multiple targets 27 fixedly distributed around the circumference. In an embodiment the pattern has uniform spacing. In an embodiment the pattern has nonuniform spacing. Preferably the pattern target members 27 have parallel sensible lines 25 with target shape members 27 aligned with the disk rotation axis, with sensed target line edges 25 normal to the disk edge, preferably with such lines 25 parallel and normal compared to being slanted. Preferably providing the first set of at least three sensors 28 comprises providing a first set of at least three variable reluctance sensors 28. Preferably providing the second set of at least three sensors 36 comprises providing a second set of at least three variable reluctance sensors 36. In an alternative preferred embodiment, providing the first set of at least three sensors 28 comprises providing a first set of at least three optical sensors 28, and preferably providing the second set of at least three sensors 36 comprises providing a second set of at least three optical sensors 36.

The invention includes a torque measurement system 19. The system is comprised of a first rotating disk 20 (Disk A) rotating about a first rotating disk center z-axis 60 with the first disk 20 oriented in an x-y plane, the first rotating disk 20 having a target pattern 22, a second rotating disk 24 (Disk B) rotating about a second rotating disk center z-axis 62 with the second disk 24 oriented in an x-y plane, the second rotating disk 24 having a target pattern 26, a sensor cradle 48 centered around a sensor cradle reference z-axis 64, the sensor cradle 48 encompassing the first rotating disk 20 and the second rotating disk 24 with a first disk first sensor 30 ($T_{1A}$), a first disk second sensor 32 ($T_{2A}$), a first disk third sensor 34 ($T_{3A}$), the first disk first sensor 30, the first disk second sensor 32, and the first disk third sensor 34 fixed around and encompassing the first rotating disk 20 and positioned for simultaneously sensing the first rotating disk target pattern 22 and pointed towards center z-axis 60, and the sensor cradle 48 including a second disk first sensor 38 ($T_{1B}$), a second disk second sensor 40 ($T_{2B}$), a second disk third sensor 42 ($T_{3B}$), the second disk first sensor 38, the second disk second sensor 40, and the second disk third sensor 42 fixed around and encompassing the second rotating disk 24 and positioned for simultaneously sensing the second rotating disk target pattern 26 and pointed towards center z-axis 62, the first disk first sensor 30 positioned adjacent the second disk first sensor 38, the first disk second sensor 32 positioned adjacent the second disk second sensor 40, and the first disk third sensor 34 positioned adjacent the second disk third sensor 42 with the sensors positioned to sense a Δx offset and a Δy offset of the first rotating disk center z-axis 60 from the sensor cradle reference z-axis 64 and a θx offset and a θy offset of first rotating disk 20 relative to sensor cradle 48 and a Δx offset and a Δy offset of the second rotating disk center z-axis 62 from the sensor cradle reference z-axis 64 and a θx offset and a θy offset of second rotating disk 24 relative to sensor cradle 48 to provide for determination of an actual twist angle $\theta_{twist}$ between the first rotating disk 20 and the second rotating disk 24 from a sensed apparent twist and the offsets, with the actual twist angle providing a measurement of torque based on a predetermined coupling compliance of the coupling 50. Preferably the sensors are fixed in parallel alignment with the sensor cradle reference z-axis 64. Preferably the first rotating disk 20 includes a first rotating shaft 52 and the second rotating disk 24 includes a second rotating shaft 54 with the first rotating shaft 52 and the second rotating shaft 64 flexibly coupled together with a center of rotation 56 between the first rotating disk and the second rotating disk. Preferably the first rotating disk target pattern 22 comprises a periodic perimeter target pattern comprised of multiple targets 23 fixedly distributed around the circumference. Preferably the second rotating disk target pattern 26 comprises a perimeter target pattern comprised of multiple targets 27 fixedly distributed around the circumference. Preferably the first disk first sensor 30, the second disk first sensor 38, the first disk second sensor 32, the second disk second sensor 40, the first disk third sensor 34 and the second disk third sensor 42 are variable reluctance sensors. In an alternative preferred embodiment the first disk first sensor 30, the second disk first sensor 38, the first disk second sensor 32, the second disk second sensor 40, the first disk third sensor 34 and the second disk third sensor 42 are optical sensors.

The invention includes a torque shaft misalignment measurement system 19. The system is comprised of a first rotating disk 20 and shaft rotating about a first rotating center z-axis 60 with the first disk oriented in an x-y plane, the first rotating disk 20 (Disk A) having a perimeter target pattern 22, a second rotating disk 24 and shaft rotating about a second rotating center z-axis 62 with the second disk oriented in an x-y plane, the second rotating disk 24 (Disk B) having a perimeter target pattern 26, the first rotating shaft 52 and the second rotating shaft 54 flexibly coupled together with a coupling 50 with a center of rotation 56 between the first rotating disk 20 and the second rotating disk 24. The invention includes a sensor cradle 48 centered around a sensor cradle reference z-axis 64, the sensor cradle encompassing the first rotating disk and the second rotating disk with a first disk first sensor 30 ($T_{1A}$), a first disk second sensor 32 ($T_{2A}$), a first disk third sensor 34($T_{3A}$), the first disk first sensor 30, the first disk second sensor 32, and the first disk third sensor 34 fixed around and encompassing the first rotating disk 20 and positioned for simultaneously sensing the first rotating disk target pattern 22 and pointed towards center z-axis 60, and the sensor cradle 48 including a second disk first sensor 38 ($T_{1B}$), a second disk second sensor 40 ($T_{2B}$), a second disk third sensor 42 ($T_{3B}$), the second disk first sensor 38, the second disk second sensor 40, and the second disk third sensor 42 fixed around and encompassing the second rotating disk 24 and positioned for simultaneously sensing the second rotating disk target pattern 26 and pointed towards center z-axis 62, the first disk first sensor positioned adjacent the second disk first sensor, the first disk second sensor positioned adjacent the second disk second sensor, and the first disk third sensor positioned adjacent the second disk third sensor with the sensors positioned to sense a Δx offset and a Δy offset of the first rotating disk center z-axis 60 from the sensor cradle reference z-axis 64 and a Δx offset and a Δy offset of the second rotating disk center z-axis 62 from the sensor cradle reference z-axis 64 to provide for determination of an actual twist angle $\theta_{twist}$ between the first rotating disk 20 (Disk A) and the second rotating disk 24 (Disk B) and an incremental offset between the first rotating center z-axis 60 and the second rotating center z-axis 62 at the center of rotation 56 to provide a measured torque and a measured shaft misalignment. Preferably the sensors are fixed in parallel alignment with the sensor cradle reference z-axis 64. Preferably the first disk first sensor 30, the second disk first sensor 38, the first disk second sensor 32, the second disk second sensor 40, the first disk third sensor 34 and the second disk third sensor 42 are variable reluctance sensors. In an alternative preferred embodiment the first disk first sensor 30, the second disk first sensor 38, the first disk second sensor 32, the second disk second sensor 40, the first disk third sensor 34 and the second disk third sensor 42 are optical sensors.

The invention includes a method of measuring a twist angle. The method includes providing a first rotating disk 20 (Disk A) having a target pattern 22, providing a second rotating disk 24 (Disk B) having a target pattern 26, providing a first set of at least three sensors 28, the first set 28 comprised of a first disk first sensor 30 ($T_{1A}$), a first disk second sensor 32 ($T_{2A}$), a first disk third sensor 34 ($T_{3A}$), this first set of at least three sensors 28 for simultaneously sensing the first rotating disk target pattern 22 with this first set of at least three sensors fixed around and encompassing the first rotating disk 20. The method includes providing a second set of at least three sensors 36 comprised of a second disk first sensor 38 ($T_{1B}$), a second disk second sensor 40 ($T_{2B}$), a second disk third sensor 42($T_{3B}$). The second set of at least three sensors 36 for simultaneously sensing the second rotating disk target pattern 26 with the second set of at least three sensors fixed around and encompassing the second rotating disk. Preferably the method includes determining an instantaneous spinning shaft speed 44 of the disks from the first, second or both disks. Preferably the method includes measuring incremental lateral and angular displacements of the first disk 20 relative to first set of sensors 28 and the second disk 24 relative to second set of sensors 36. Preferably the disk 20 incremental and lateral displacement measurements are computed from relative timing measurements between the sensors of set 28 sensing disk 20. Preferably the disk 24 incremental and lateral displacement measurements are computed from relative timing measurements between the sensors of set 36 sensing disk 24. The method includes measuring an apparent twist of the first rotating disk 20 relative to the second rotating disk 24 with the first set of at least three sensors 28 and the second set of at least three sensors 36. Preferably the apparent twist measurements are computed from relative timing measurements between the sensors sensing disk 20 (Disk A) and disk 24 (Disk B). The method includes determining an actual twist angle $\theta_{twist}$ from the measured apparent twist, preferably with the measured incremental lateral and angular displacements and positional displacement of disk 20 (Disk A) and disk 24 (Disk B). Preferably the method includes compensating for a lateral displacement of the first rotating disk 20 (Disk A) and a lateral displacement of the second rotating disk 24 (Disk B), preferably by measuring an incremental lateral and angular displacements of first disk 20

(Disk A) relative to the first set of sensors 28 and the second disk 24 (Disk B) relative to the second set of sensors 36 and using these measurements to determine the measured incremental lateral and angular displacements. Preferably providing the first set of sensors 28 includes providing a sensor cradle 48 with the first disk first sensor 30 ($T_{1A}$) separated from the first disk with a gap 31, the first disk second sensor 32 ($T_{2A}$) separated from the first disk with a gap 33, the first disk third sensor 34 ($T_{3A}$) separated from the first disk with a gap 35, and the method including compensating for a variation in the gap 31 between first disk first sensor 30 ($T_{1A}$) and the first disk 20, a variation in the gap 33 between the first disk second sensor 32 ($T_{2A}$) and the first disk 20, and a variation in the gap 35 between the first disk third sensor 34 ($T_{3A}$) and the first disk 20. Preferably providing the second set of sensors 36 includes providing a sensor cradle 48 with the second disk first sensor 38 ($T_{1B}$) separated from the second disk 24 with a gap 39, the second disk second sensor 40 ($T_{2B}$) separated from the second disk 24 with a gap 41, the second disk third sensor 42 ($T_{3B}$) separated from the second disk 24 with a gap 43, and the method including compensating for a variation in the gap 39 between the second disk first sensor and the second disk, a variation in the gap 41 between the second disk second sensor and the second disk, and a variation in the gap 43 between the second disk third sensor and the second disk. Preferably the method includes providing a sensor cradle 48 for circumferentially fixing the position of the first set of at least three sensors 28 and the second set of at least three sensors 36, with the first disk first sensor 30 ($T_{1A}$) positioned adjacent and aligned with the second disk first sensor 38 ($T_{1B}$), the first disk second sensor 32 ($T_{2A}$) positioned adjacent and aligned with the second disk second sensor 40 ($T_{2B}$), and the first disk third sensor 34 ($T_{3A}$) positioned adjacent and aligned with the second disk third sensor 42 ($T_{3B}$), preferably the first disk first sensor and the second disk first sensor are axially aligned, the first disk second sensor and the second disk second sensor are axially aligned, and the first disk third sensor and the, second disk third sensor are axially aligned. Most preferably the axially aligned first disk first sensor and the second disk first sensor, the axially aligned first disk second sensor and the second disk second sensor, and the axially aligned first disk third sensor and the second disk third sensor are in parallel alignment with the alignment oriented with the rotation axis of the disks. Preferably the method including compensating for a gap variation between a disk sensor and a disk. Preferably providing the first rotating disk includes providing the first rotating disk 20 with a first rotating shaft 52 and providing the second rotating disk includes providing the second rotating disk 24 with a second rotating shaft 54 with the first rotating shaft 52 and the second rotating shaft 54 flexibly coupled together with a center of rotation 56 between the first rotating disk and the second rotating disk, and the method includes determining an angular misalignment between the first rotating shaft 52 and the second rotating shaft 54, preferably by measuring and determining the misalignment between the disks 20 and 24 to provide the shaft misalignment. Preferably providing the first rotating disk 20 having a target pattern 22 comprises providing the first rotating disk 20 having a periodic perimeter target pattern 22 comprised of multiple targets 23 fixedly distributed around the circumference. In an embodiment the pattern has uniform spacing. In an embodiment the pattern has nonuniform spacing. Preferably the pattern target members 23 have parallel sensible lines 21 with target shape members aligned with the rotation axis, with the sensed target line edges 21 normal to the disk edge, preferably with such lines 21 parallel and normal compared to being slanted. Preferably providing the second rotating disk 24 having a target pattern 26 comprises providing the second rotating disk having a periodic perimeter target pattern comprised of multiple targets 27 fixedly distributed around the circumference. In an embodiment the pattern has uniform spacing. In an embodiment the pattern has nonuniform spacing. Preferably the pattern target members 27 have parallel sensible lines 25 with target shape members aligned with the rotation axis, with sensed target line edges 25 normal to the disk edge, preferably with such lines 25 parallel and normal compared to being slanted. Preferably providing the first set of at least three sensors 28 comprises providing a first set of at least three variable reluctance sensors 28. Preferably providing the second set of at least three sensors 36 comprises providing a second set of at least three variable reluctance sensors 36. In an alternative preferable embodiment providing the first set of at least three sensors 28 comprises providing a first set of at least three optical sensors 28. In an alternative preferable embodiment providing the second set of at least three sensors 36 comprises providing a second set of at least three optical sensors 36.

The invention includes a twist angle measurement system 19. The system 19 is comprised of a first rotating disk 20 (Disk A) rotating about a first rotating disk center z-axis 60 with the first disk 20 oriented in an x-y plane, the first rotating disk 20 having a target pattern 22, a second rotating disk 24 (Disk B) rotating about a second rotating disk center z-axis 62 with the second disk 24 oriented in an x-y plane, the second rotating disk 24 having a target pattern 26, a sensor cradle 48 centered around a sensor cradle reference z-axis 64, the sensor cradle 48 encompassing the first rotating disk 20 and the second rotating disk 24 with a first disk first sensor 30 ($T_{1A}$), a first disk second sensor 32 ($T_{2A}$), a first disk third sensor 34 ($T_{3A}$), the first disk first sensor, the first disk second sensor, and the first disk third sensor fixed around and encompassing the first rotating disk 20 and positioned for simultaneously sensing the first rotating disk target pattern 22 and pointed towards center z-axis 60, and the sensor cradle 48 including a second disk first sensor 38 ($T_{1B}$), a second disk second sensor 40 ($T_{2B}$), a second disk third sensor 42 ($T_{3B}$), the second disk first sensor, the second disk second sensor, and the second disk third sensor fixed around and encompassing the second rotating disk 24 and positioned for simultaneously sensing the second rotating disk target pattern 26 and pointed towards center z-axis 62, the first disk first sensor 30 ($T_{1A}$) positioned adjacent the second disk first sensor 38 ($T_{3B}$), the first disk second sensor 32 ($T_{2A}$) positioned adjacent the second disk second sensor 40 ($T_{2B}$), and the first disk third sensor 34 ($T_{3A}$) positioned adjacent the second disk third sensor 42 ($T_{3B}$) with the sensors positioned to sense a Δx offset and a Δy offset of the first rotating disk center z-axis 60 from the sensor cradle reference z-axis 64 and a θx offset and a θy offset of first rotating disk relative to sensor cradle and a Δx offset and a Δy offset of the second rotating disk center z-axis 62 from the sensor cradle reference z-axis 64 and a θx offset and a θy offset of second rotating disk relative to sensor cradle to provide for determination of an actual twist angle $\theta_{twist}$ between the first rotating disk 20 and the second rotating disk 24 from a sensed apparent twist and the offsets. Preferably the sensors are fixed in parallel alignment with the sensor cradle reference z-axis 64. Preferably the first rotating disk 20 includes a first rotating shaft 52 and the second rotating disk 24 includes a second rotating shaft 54 with the first rotating shaft 52 and the second rotating shaft 54 flexibly coupled together with a coupling 50 with a center of rotation 56 between the first rotating disk 20 and the second rotating disk 24. Preferably the first rotating disk target pattern 22 comprises a periodic perimeter target pattern comprised of multiple targets 23 fixedly distributed around the circumference. Preferably the second rotating disk target pattern 26 comprises a perimeter target pattern comprised of multiple targets 27 fixedly distributed around the circumference. Preferably the first disk first sensor 30, the second disk first sensor 38, the first disk second sensor 32, the second disk second sensor 40, the first disk third sensor 34 and the second disk third sensor 42 are variable reluctance sensors. In an alternative embodiment the first disk first sensor 30, the second disk first sensor 38, the first disk second sensor 32, the second disk second sensor 40, the first disk third sensor 34 and the second disk third sensor 42 are optical sensors.

The invention provides reliable and precise twist and alignment measurements using tachometer sensors. Tile inventive method/system for measuring twist and alignment preferably includes two target disks 20 and 24 and a plurality of sensors positioned around the targets disks, preferably with the sensors rigidly positioned with a sensor housing cradle 48. The first and second rotating target disks 20 and 24, labeled Disk A and Disk B, and are shown in FIG. 1. The disks are oriented predominantly parallel to the x-y plane and are spinning about an axis predominantly parallel to the z-axis as indicated in FIG. 1. Each disk has a target pattern 22, 26 along its outer perimeter, preferably a specific periodic pattern marked on, engraved on or embedded into the outer periphery. The disks are fixedly attached to a coupling 50, preferably a flexible coupling and/or a shaft coupling, across which we want to measure twist and/or alignment. The target disks 20, 24 need not be separate components added to the shaft coupling system to be monitored since the target patterns may be integrated directly as part of the shaft or coupling. Without loss of generality, this analysis will refer to the target disks 20 and 24 as separate rotating disks.

The sensor housing cradle 48, is shown in FIG. 1 as three separate bars or arms 49 with sensors T encompassing the rotating disks 20 and 24. The arms 49 may be connected together at either end, or they may be constructed as a single mechanical piece that contains all the sensors.

Preferably the target disks 20 and 24 are rigid bodies, preferably with no bending or flexing of the disks.

Preferably the sensor housing cradle 48 is a rigid body, preferably with no relative motion between the sensors T (30,32,34,38,40,42) within the sensor housing 48.

Preferably an absolute x-y-z coordinate system housing reference frame is defined by the sensor housing 48, with measurements made relative to the housing reference frame 48. Note that this absolute coordinate system can move if the rigid sensor housing 48 experiences any motion relative to an inertial reference frame.

While the target disks 20,24 are spinning, both target disks can experience motions in each of their six rigid body degrees of freedom. The time-varying target disk motions may be relative to the sensor housing 48 and/or relative to each other. FIG. 1 indicates that the axis of rotation of each disk may not be coincident with or parallel to the axis 64 of the sensor housing 48. The center of Disk A is shown to be offset by an amount $\{\Delta x_A, \Delta y_A\}$, and the center of Disk B is shown to be offset by a possibly different amount $\{\Delta x_B, \Delta y_B\}$.

The disk displacements $\{\Delta x_A(t), \Delta y_A(t)\}$ and $\{\Delta x_B(t), \Delta y_B(t)\}$ can be time-varying; preferably with the spectra of these displacements predominantly concentrated at or below the shaft rotational frequency. This provides a quasi-stationarity of the displacements during incremental or small fractional rotations of the shaft. Preferably the invention utilizes explicit measurement of time intervals from pulses generated by the passage of target patterns 22, 26.

The target patterns 22, 26 preferably have an angular extent ($\phi$-direction) that is small relative to one revolution, preferably less than 10°. For example, a tachometer pulse that lasts for one-quarter revolution (90°) of the shaft could experience non-stationary behavior of the shaft during the measurement, which would lead to erroneous measurement of the pulse duration.

The hoops 70 in FIG. 1 represent boundaries within which the target disks 20,24 are confined to spin and move. Note that these boundaries need not be physical. For example, a target disk moving outside its boundary could result in undesirable contact between the disk and the sensor housing 48.

With regard to the target patterns 22, 26, Disk A and Disk B are preferably identical to each other. In addition, the disks 20, 24 are preferably installed such that in the zero twist angle/zero misalignment condition, both sets of target patterns 22, 26 are aligned with each other in the $\phi$-direction (measured in the x-y plane, ccw from the x-axis of the housing, as indicated in FIG. 1). The sensor arms 49 shown in FIG. 1 were intentionally drawn as three distinct components, in that the sensors T in each arm are preferably oriented at the same angular position relative to tile housing coordinate system. For example, sensors $T_{3A}$ and $T_{3B}$ are both mounted at an angle of $\phi_3$. This preferred implementation is not a requirement, in that if for example, sensors $T_{3A}$ and $T_{3B}$ were mounted at different angles, $\phi_{3A} \neq \phi_{3B}$, then Disk A and Disk B could be installed with a corresponding relative twist to cancel out the angular offset in those sensors. A less desirable but still feasible option is to perform a calibration step that would require accurate apriori knowledge of the zero twist/zero misalignment state so the associated offsets in timing delays could be calibrated out.

Preferably the target member regions 23, 27 of the proposed patterns induce a logical true or high value when in close proximity to a digital tachometer sensor of the sets 28, 36, and likewise, the adjacent regions on the other side of the sensible lines 21, 25 induce a logical false or low value. As the disks spin at the shaft rotational frequency, the passage of target patterns by the tachometer sensors of the sets 28, 36 produce an analog or digital pulse train output signal with a generally varying duty-cycle. The precise definition of close proximity will depend on the type of tachometer sensor used in the sensor sets 28, 36 as well as the specific mechanical realization of the target pattern. Preferably the tachometer sensor T is triggered high or low when a sensible line pattern edge crosses through a line drawn between the current center of rotation of the disk and the sensor T. Wherever this line intersects the rim of the disk will be the closest point to the sensor T. The shaft speed may vary with time; however, the speed preferably is to be quasi-stationary, preferably with the shaft rotational speed 44 substantially constant during incremental or small fractional rotations of the shaft (preferably constant with fractional rotations<45°).

Without loss of generality, we assume Disk A to be the reference disk; therefore, twist and alignment measurements are made of Disk B relative to Disk A.

Figure 2A:
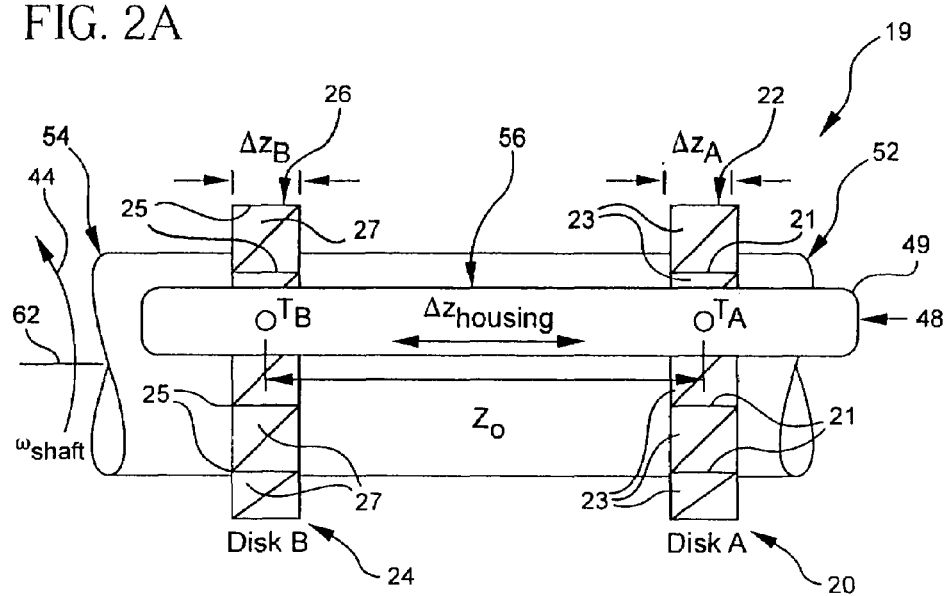
FIG. 2A shows an embodiment of the invention.
Figure 2B:
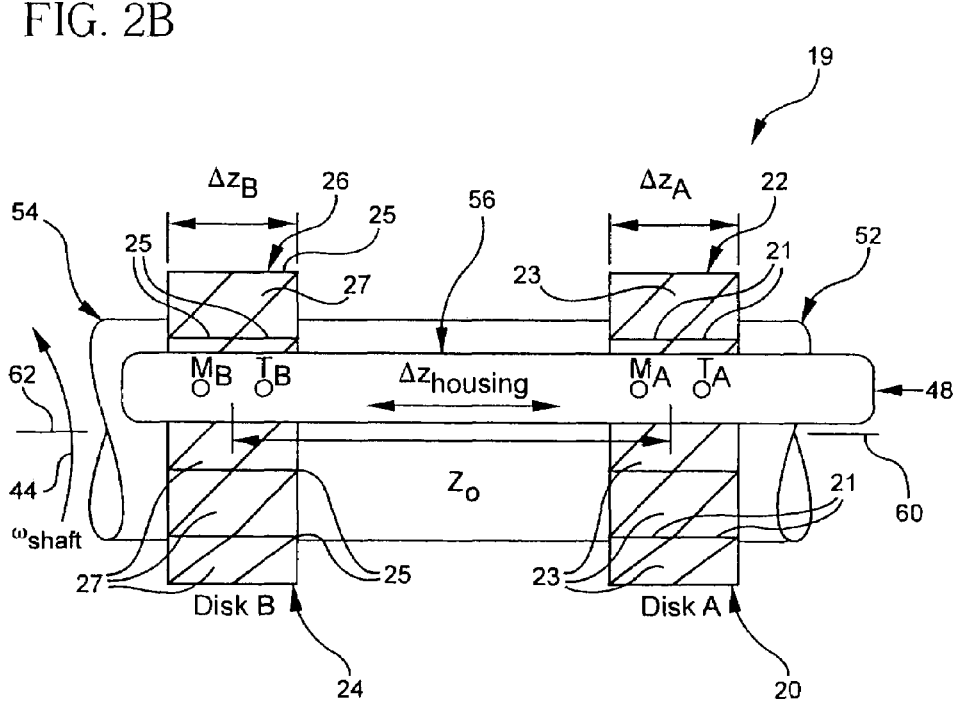
FIG. 2B shows an embodiment of the invention.

In regards to target patterns 22 and 26, FIG. 2A shows an overhead view embodiment of a single sensor arm 49 positioned over the two target disks 20, 24 for the preferred implementation. FIG. 2A also shows a preferred target pattern on the target disks for a minimal set of sensors (2 sensors/arm 49, 6 sensors/housing 48). FIG. 2B shows an embodiment pattern for a redundant set of sensors (sensor T and redundant extra sensor M) (4 sensors/arm 49, 12 sensors/housing 48). The precise geometry of the target pattern should be governed by the amount of axial (z-direction) deflection that the disks will experience. Many variations of the pattern are possible to allow for additional features.

Figure 3:
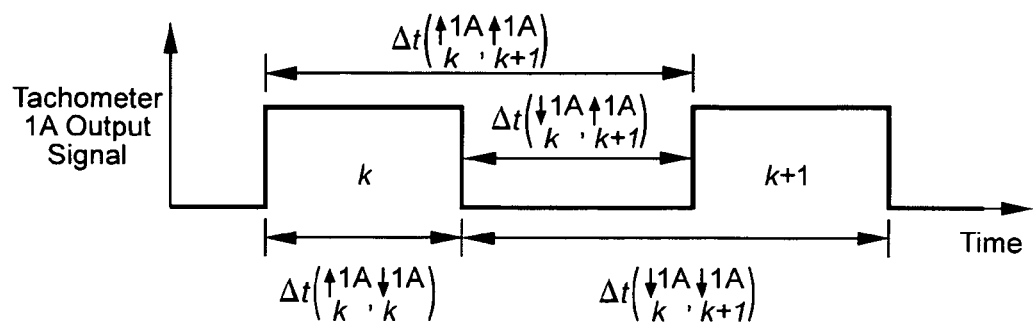
FIG. 3 shows an embodiment of the invention.

The invention preferably utilizes speed measurement with both the twist and alignment measurements utilizing instantaneous knowledge of the shaft speed 44. Shaft speed can be determined from any individual tachometer sensor T by measuring the time between two consecutive rising (or falling) edges of the target's sensible lines. Mathematically, this is expressed with the following notation $$\omega_{shaft}\left(\frac{rad}{sec}\right) = \left(\frac{\phi_o}{\Delta t(\uparrow_k^{1A}, \uparrow_{k+1}^{1A})}\right) = \left(\frac{\phi_o}{\Delta t(\downarrow_k^{1A}, \downarrow_{k+1}^{1A})}\right) \quad (1)$$

where $\phi_o$ (radians) is the known angular distance between sensible line leading (or trailing) edges of the target pattern 22, 26, $$\Delta t(\uparrow_k^{1A}, \uparrow_{k+1}^{1A})$$

represents the time between consecutive rising edges from sensor $T_{1A}$, and $$\Delta t(\downarrow_k^{1A}, \downarrow_{k+1}^{1A})$$

represents the time between consecutive falling edges from sensor $T_{1A}$. These timing definitions are graphically shown in FIG. 3 as well as two additional pulse width definitions, with FIG. 3 showing the notational definitions of timing measurements from tachometer signals.

The timing measurements are made with a high-speed clock driving a counter, which is started with one rising (or falling) edge and stopped or reset with the next rising (or falling) edge. In the preferred implementation of FIG. 1, there are six possible sensors T that can be used to extract speed (timing) measurements. If required, instantaneous speed estimates could be obtained by averaging speed estimates from both rising and falling edges as well as from multiple sensors T.

Preferably a misalignment measurement is computed by first measuring the incremental displacements $\{\Delta z_1, \Delta z_2, \Delta z_3\}$ at three points around the perimeter of each target disk, preferably with utilizing a plurality of sets of sensors 28, 36, such as with the three sensor arms 49 in FIG. 1. The incremental displacements of the target disks are measured relative to the sensor housing 48 by measuring the duration of the pulses induced by passage of the target patterns 22, 26. With regard to FIG. 2A, the rising edge from either sensor $T_A$ or $T_B$ will be insensitive to axial displacements, however, the falling edge will be a function of axial displacement $\Delta z$. By measuring the time between the rising and falling edges, and also knowing the shaft speed, we can compute the axial displacement $\{\Delta z\}$ at that sensor by:

$$\Delta z_{nA}(\text{in}) = M\left(\frac{\text{in}}{\text{rad}}\right) \times \omega_{shaft}\left(\frac{\text{rad}}{\text{sec}}\right) \times \Delta t(\uparrow_k^{1A}, \downarrow_k^{1A})(\text{sec}) \quad (2)$$

where n={1, 2, 3} is the sensor number, and M is a known slope that is explicitly defined by the target pattern and relates the change in displacement along the z-axis to a corresponding angular extent of the pattern. The pulse width duration $\Delta t$ is described above and shown in FIG. 3. With regard to the redundant system of FIG. 2B, we can not only measure the pulse width between the rising and falling edges from each of sensors M and T, but we can also measure the time between rising (and falling) edges of both sensors simultaneously. This architecture is redundant and would generally require more of the same kind of processing as for the non-redundant case.

Figure 4:
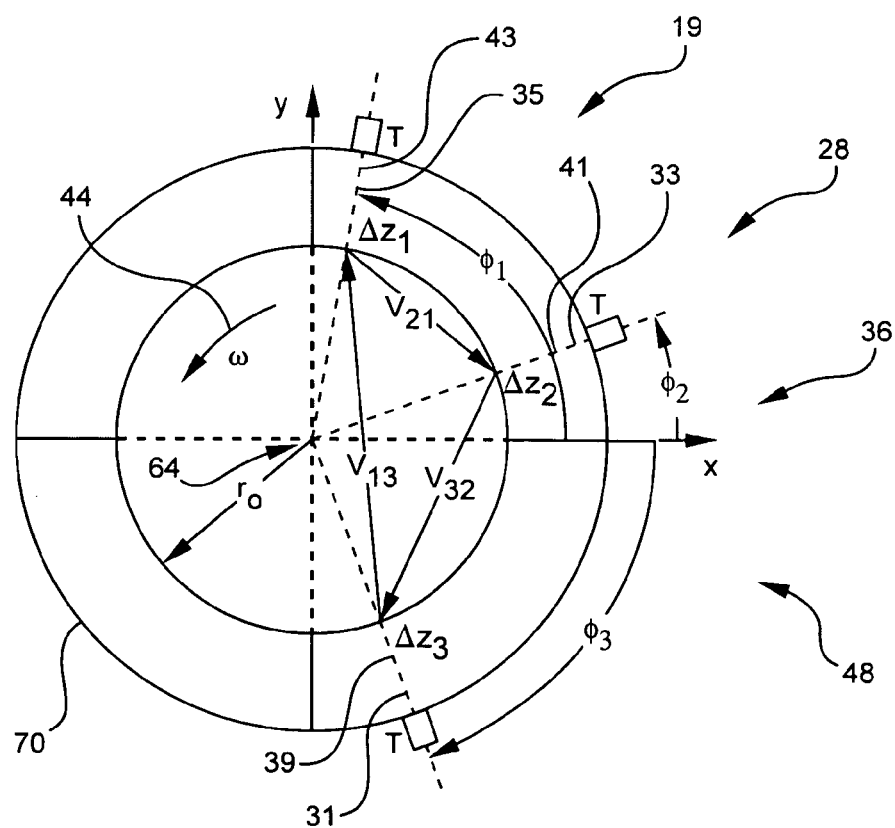
FIG. 4 shows an embodiment of the invention.

Once we know the axial displacement at three unique points around the perimeter of each disk, i e. $\{\Delta z_{1A}, \Delta z_{2A}, \Delta z_{3A}\}$ and $\{\Delta z_{1B}, \Delta x_{2B}\}$, then the vector method for determining the angular variation between two planes may be used to compute angular misalignment. FIG. 4 shows a vector diagram for computing a normal vector on a target disk. The three points at the perimeter of a target disk are represented by vectors in the absolute x-y-z coordinate system. For a general disk, these vectors are given by (but not shown in FIG. 4):

$$V_1 = [\Delta x + r_o\cos\phi_1]\hat{x} + [\Delta y + r_o\sin\phi_1]\hat{y} + [\Delta z_1 + z_{nominal}]\hat{z} \quad (3)$$
$$V_2 = [\Delta x + r_o\cos\phi_2]\hat{x} + [\Delta y + r_o\sin\phi_2]\hat{y} + [\Delta z_2 + z_{nominal}]\hat{z}$$
$$V_3 = [\Delta x + r_o\cos\phi_3]\hat{x} + [\Delta y + r_o\sin\phi_3]\hat{y} + [\Delta z_3 + z_{nominal}]\hat{z}$$

where $r_o$ is the nominal radius of the target disk, and $\hat{x}$, $\hat{y}$, and $\hat{z}$ are unit vectors in the x-, y-, and z-directions respectively. As will be shown, the nominal distance $z_{nominal}$ is arbitrary. To compute the normal vector for a given disk, we need two vectors residing on the disk itself. FIG. 4 indicates that there are three possibilities available:

$$V_{21} = \quad (4)$$
$$V_2 - V_1 = r_o[\cos\phi_2 - \cos\phi_1]\hat{x} + r_o[\sin\phi_2 - \sin\phi_1]\hat{y} + [\Delta z_2 - \Delta z_1]\hat{z}$$
$$V_{32} = V_3 - V_2 =$$
$$r_o[\cos\phi_3 - \cos\phi_2]\hat{x} + r_o[\sin\phi_3 - \sin\phi_2]\hat{y} + [\Delta z_3 - \Delta z_2]\hat{z}$$
$$V_{13} = V_1 - V_3 = r_o[\cos\phi_1 - \cos\phi_3]\hat{x} +$$
$$r_o[\sin\phi_1 - \sin\phi_3]\hat{y} + [\Delta z_1 - \Delta z_3]\hat{z}$$

Notice from (4) that we only need to measure the relative displacements $\{\Delta z\}$. All other quantities are constant and known. The absolute positions $z_{nominal}$ along the z-axis as well as the disk motions in the x and y directions all cancel out and thus are not required. The normal vectors for Disk A and B are then computed similarly and redundantly as:

$$N_A = V_{32A} \times V_{21A} = V_{13A} \times V_{32A} = V_{21A} \times V_{13A}$$
$$N_B = V_{32B} \times V_{21B} = V_{13B} \times V_{32B} = V_{21B} \times V_{13B} \quad (5)$$

Any of the three vector cross-products should give the same answer; however, in practice it may be best to take full advantage of the redundancy by either averaging or using the additional measurements to diagnose potential problems. Finally, the angular deviation $\theta_{alignment}$ between the two normal vectors, representing the primary measure of misalignment, is computed as $$\theta_{alignment} = \cos^{-1}\left(\frac{N_A \cdot N_B}{|N_A||N_B|}\right) \quad (6)$$

Measurement of misalignment alone requires a minimum of six tachometer sensors T to provide the appropriate information. To increase the redundancy of alignment measurement, a minimum of two additional sensors T are preferred, preferably such as by adding a fourth cradle sensor arm 49 with a first disk fourth sensor and a second disk fourth sensor. A secondary measure of alignment will be described below as a by-product of the twist measurement procedure.

Preferably the invention provides a twist measurement with twist measured as the angular displacement of Disk B relative to Disk A around the z-axis. Preferably the method for measuring twist includes measuring the timing difference between the sensible lines rising (or falling) edges of the pulses from corresponding sensors on Disk A and Disk B. Using the notation defined above, for three sensor arms 49, there are three possible measurements:

$$\Delta t(\uparrow_k^{1B}, \uparrow_k^{1A}) = \Delta t(\downarrow_k^{1B}, \downarrow_k^{1A}) \quad (7)$$
$$\Delta t(\uparrow_k^{2B}, \uparrow_k^{2A}) = \Delta t(\downarrow_k^{2B}, \downarrow_k^{2A})$$
$$\Delta t(\uparrow_k^{3B}, \uparrow_k^{3A}) = \Delta t(\downarrow_k^{3B}, \downarrow_k^{3A})$$

We may use either rising or falling edges (both should be equivalent), however, only three of the timing measurements are independent (i.e. one from each pair above).

In the very special case where the offsets of Disk A and Disk B are all zero, i.e. $\Delta x_A = \Delta x_B = 0$, and $\Delta y_A = \Delta y_B = 0$, then any one of the measurements in (7) along with the instantaneous rotational speed of the shaft from (1) will provide a simple and redundant measurement of twist.

$$\tilde{\theta}_1 = \omega_{shaft} \Delta t(\uparrow_k^{1B}, \uparrow_k^{1A}) \quad (8)$$
$$\tilde{\theta}_2 = \omega_{shaft} \Delta t(\uparrow_k^{2B}, \uparrow_k^{2A})$$
$$\tilde{\theta}_3 = \omega_{shaft} \Delta t(\uparrow_k^{3B}, \uparrow_k^{3A})$$

The timing measurements in (7) will be distorted by offset displacements of the target disks. In this sense, the quantities on the LHS of (8), i.e. $\tilde{\theta}_1$, $\tilde{\theta}_2$, and $\tilde{\theta}_3$, are apparent twist angles. FIG. 5 shows an analysis of timing effects associated with x-y motion of the target disk. To clarify this point, we first consider only the reference disk as shown in FIG. 5.

Figure 5A:
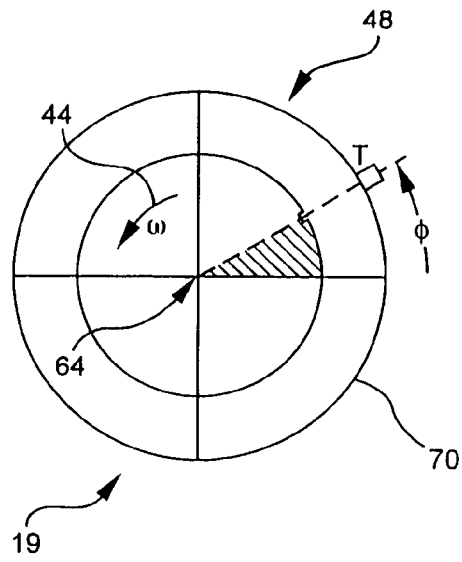
FIG. 5A shows an embodiment of the invention.
Figure 5B:
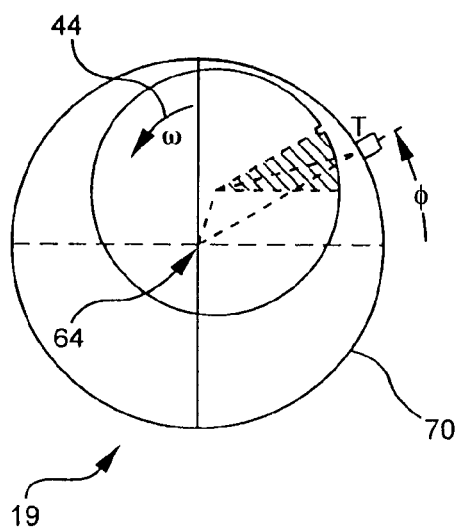
FIG. 5B shows an embodiment of the invention.

FIG. 5A shows Disk A perfectly centered on the x-y axis of the sensor housing 48. For simplicity, a single notch is drawn on the perimeter of the disk. First we rotate this notch up to the sensor T located at $\phi$ radians from the x-axis, as indicated by the shaded wedge in FIG. 5A. Now assume Disk A is Fixedly offset from the axis 64 of the sensor housing 48, as shown in FIG. 5B. For the offset example of FIG. 5B, it is clear that rotating the notch through the same $\phi$ radians will cause the notch to move beyond the sensor.

Figure 6:
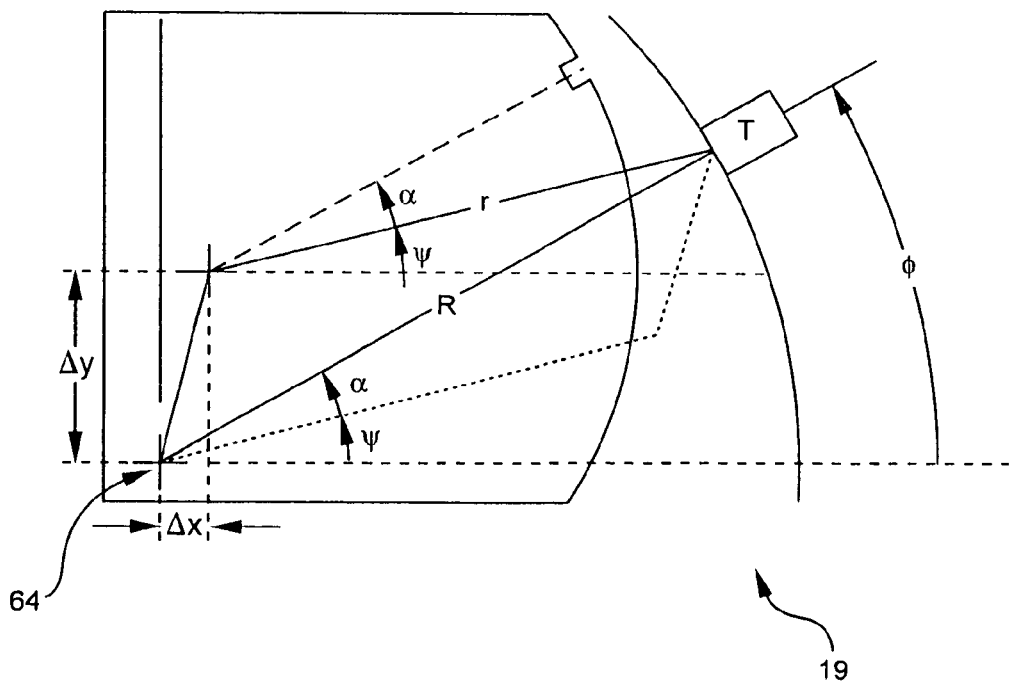
FIG. 6 shows and embodiment of the invention.

FIG. 6 shows an enlarged view of FIG. 5B with some additional angles defined to provide a detailed analysis diagram for twist measurement. As indicated in FIG. 6, the notch only has to rotate through $\psi_0$ radians to reach the sensor in the offset example of FIG. 5B. The absolute angle $\psi$ is actually irrelevant for this analysis. The critical parameter is the relative angle $\alpha \equiv \phi - \psi$. This relative angle can be thought of as the apparent angular distortion induced by offsets in the center of rotation, and measured at the sensor located at $\phi$, thus we could write $\alpha = \alpha(\phi, \Delta x, \Delta y)$. This distortion clearly has a significant impact on the measurement of twist angle and the associated timing pulses from the tachometer sensors. Fortunately the angular distortion $\alpha$ can be related to the offset parameters. If we sum up the x- and y-direction components of the triangle in FIG. 6, then divide the two resulting equations, we get $$\begin{matrix} r\sin\psi = R\sin\phi - \Delta y \\ r\cos\psi = R\cos\phi - \Delta x \end{matrix} \Rightarrow \tan\psi = \left(\frac{\sin\phi - \left(\frac{\Delta y}{R}\right)}{\cos\phi - \left(\frac{\Delta x}{R}\right)}\right) \quad (9)$$

From the geometric definition of $\alpha$ we see that $$\alpha(\phi, \Delta x, \Delta y) = \phi - \tan^{-1}\left(\frac{\sin\phi - \left(\frac{\Delta y}{R}\right)}{\cos\phi - \left(\frac{\Delta x}{R}\right)}\right) \quad (10)$$

where again $\phi$ is the known position of the sensor T, and R is the known radius of the sensor housing. Equation (10) is cumbersome to use because the unknown displacements $\Delta x$ and $\Delta y$ are arguments of a transcendental function. For small displacements, equation (10) simplifies to the following $$\left(\frac{\Delta y}{R}\right) \ll 1 \text{ and } \left(\frac{\Delta x}{R}\right) \ll 1 \Rightarrow \alpha(\phi, \Delta x, \Delta y) \approx \left(\frac{\Delta y}{R}\right)\cos\phi - \left(\frac{\Delta x}{R}\right)\sin\phi \quad (11)$$

Figure 7:
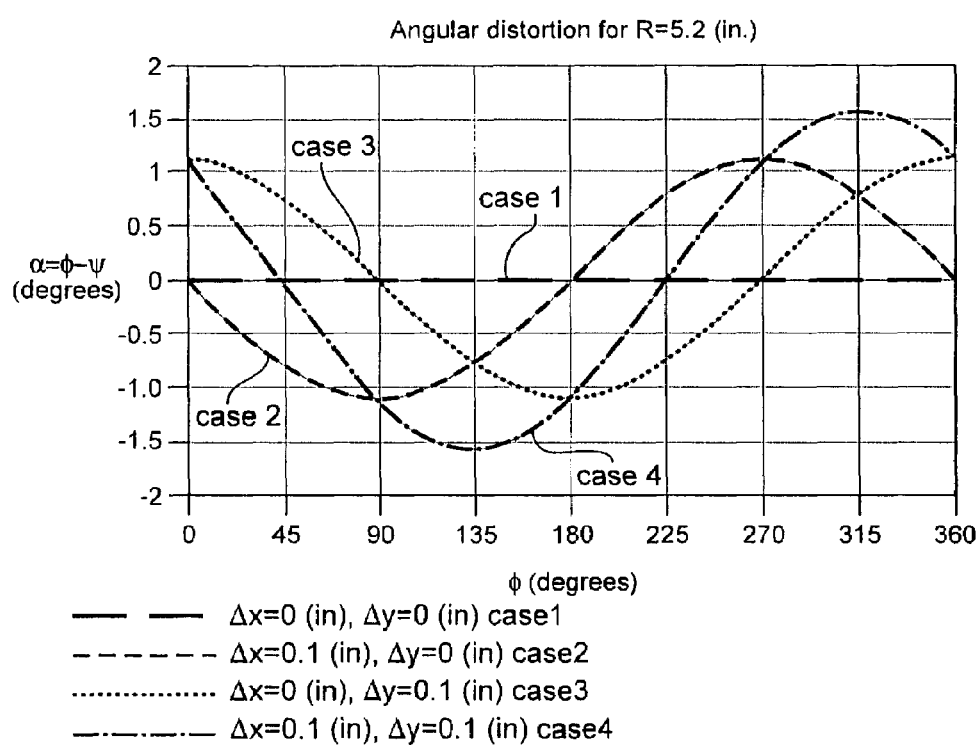
FIG. 7 illustrates performance of the invention.

Equation (11) is much simpler to use since it is linear in $\Delta x$ and $\Delta y$. FIG. 7 compares the exact result in (10) with the approximation of (11) for a 10 inch diameter disk with a 0.200 inch nominal clearance between the disk and the sensor housing. Angular distortion is plotted in FIG. 7 as a function of sensor angle $\phi$. FIG. 7 illustrates small motion approximation results for angular distortions. The wide lines in FIG. 7 represent the exact solution, and the thin underlying lines inside the wide lines represent the approximation. As indicated in FIG. 7, four offset cases were examined: 1) no offset, 2) x-dir offset only, 3) y-dir offset only, and 4) combined x- and y-dir offsets. The results in FIG. 7 are also intuitively correct. For example, consider the case 2) offset in FIG. 7. With an x-dir offset only, we would not expect any distortion at $\phi = 0°$ or at $\phi = 180°$, and we would expect maximum distortion at $\phi = +90°$ and at $\phi = -90°$. The desire to use the simple but accurate approximation of equation (11) should strongly influence the design of the sensor housing (i.e. radius R) to meet the small relative displacement assumptions indicated in (11).

Equation (8) provides a simple measure of the apparent twist angle. The analysis above indicates that this measure will be distorted by displacement offsets of each target disk. In addition, pure twist of Disk B relative to Disk A will induce a uniform angular offset in all of the sensors on Disk B relative to the corresponding sensors on Disk A. This uniform offset associated with twist is ultimately the quantity we want to measure. Using the results from equations (8) and (10) or (11), we can relate the apparent twist angle to the actual twist angle by $$\underbrace{\tilde{\theta}_n}_{\substack{apparent \\ twist}} = \underbrace{\theta_{twist}^x}_{\substack{actual \\ twist}} + \underbrace{\alpha(\phi_n, \Delta\tilde{x}_A, \Delta\tilde{y}_A)}_{distortion\ at\ disk\ A} \stackrel{?}{-} \underbrace{\alpha(\phi_n, \Delta\tilde{x}_B, \Delta\tilde{y}_B)}_{distortion\ at\ disk\ B} \quad n = \{1, 2, 3\} \quad (12)$$

where n is the sensor pair number. Notice from (12) that when the distortion terms are zero, the apparent twist measurement is equivalent to the actual twist. Although equation (12) produces three equations, there are five unknowns as indicated by the superscript x's ($^x$). Using the sensor configuration shown in FIG. 1, we can extract additional constraint equations from the sensors at Disk A alone. Employing the same reasoning as above, we can measure timing differences between rising (or falling) edges of pairs of sensors on Disk A to obtain the following three equations $$\theta_{12} = \omega_{shaft}\Delta t(\uparrow_k^{1A}, \uparrow_k^{2A}) \stackrel{?}{=} +\alpha(\phi_1, \Delta x_A, \Delta y_A) \stackrel{?}{-} \alpha(\phi_2, \Delta x_A, \Delta y_A) \quad (13)$$

$$\theta_{23} = \omega_{shaft}\Delta t(\uparrow_k^{2A}, \uparrow_k^{3A}) \stackrel{?}{=} +\alpha(\phi_2, \Delta x_A, \Delta y_A) \stackrel{?}{-} \alpha(\phi_3, \Delta x_A, \Delta y_A)$$

$$\theta_{31} = \omega_{shaft}\Delta t(\uparrow_k^{3A}, \uparrow_k^{1A}) \stackrel{?}{=} +\alpha(\phi_3, \Delta x_A, \Delta y_A) \stackrel{?}{-} \alpha(\phi_1, \Delta x_A, \Delta y_A)$$

These three equations only have two unknowns. Using the approximation from equation (11), we can take any two equations from (13) to solve for the unknown displacement offsets. For example the first two equations in (13) may be written in matrix form as $$\begin{bmatrix} -(\sin\phi_1 - \sin\phi_2) & (\cos\phi_1 - \cos\phi_2) \\ -(\sin\phi_2 - \sin\phi_3) & (\cos\phi_2 - \cos\phi_3) \end{bmatrix} \begin{bmatrix} \Delta x_A \\ \Delta y_A \end{bmatrix} = \begin{bmatrix} R\omega_{shaft}\Delta t(\uparrow_k^{1A}, \uparrow_k^{2A}) \\ R\omega_{shaft}\Delta t(\uparrow_k^{2A}, \uparrow_k^{3A}) \end{bmatrix} \quad (14)$$

which is solvable and has no singularity issues since we generally can choose the placement of sensors. If necessary, all three equations in (13) can be employed to generate a least squares solution.

Substituting the displacement offset solutions for Disk A obtained from equation (14) and the measurements from equation (8) into equation (12) yields three equations and three remaining unknowns $$\begin{bmatrix} R & \sin\phi_1 & -\cos\phi_1 \\ R & \sin\phi_2 & -\cos\phi_2 \\ R & \sin\phi_3 & -\cos\phi_3 \end{bmatrix} \begin{bmatrix} \theta_{twist} \\ \Delta x_B \\ \Delta y_B \end{bmatrix} = \begin{bmatrix} R\omega_{shaft}\Delta t(\uparrow_k^{1B}, \uparrow_k^{1A}) + \Delta x_A\sin\phi_1 - \Delta y_A\cos\phi_1 \\ R\omega_{shaft}\Delta t(\uparrow_k^{2B}, \uparrow_k^{2A}) + \Delta x_A\sin\phi_2 - \Delta y_A\cos\phi_2 \\ R\omega_{shaft}\Delta t(\uparrow_k^{3B}, \uparrow_k^{3A}) + \Delta x_A\sin\phi_3 - \Delta y_A\cos\phi_3 \end{bmatrix} \quad (15)$$

Equation (15) is also solvable with no singularity issues for the same reasons as mentioned above. In addition to providing a measure of the twist angle $\theta_{twist}$, equations (15) and (14) also provide secondary measures of shaft alignment, i.e. $\{\Delta x_A, \Delta y_A, \Delta x_B, \Delta y_B\}$.

As indicated above, the twist and alignment measurements require input data flow in the form of precision timing measures $\Delta t$. The rising and falling sensible line edges of the tachometer signals provide the triggering inputs for when to measure the times, but the actual occurrence of these sensible line edges is dependent on the speed 44 of the rotating shaft. The timing measurements for the rising and falling sensible line edges are considered asynchronous with respect to a fixed clock. We ultimately need to convert this asynchronous data flow to a synchronous data flow so we can provide measurements of twist and alignment at regular fixed time intervals.

Figure 8:
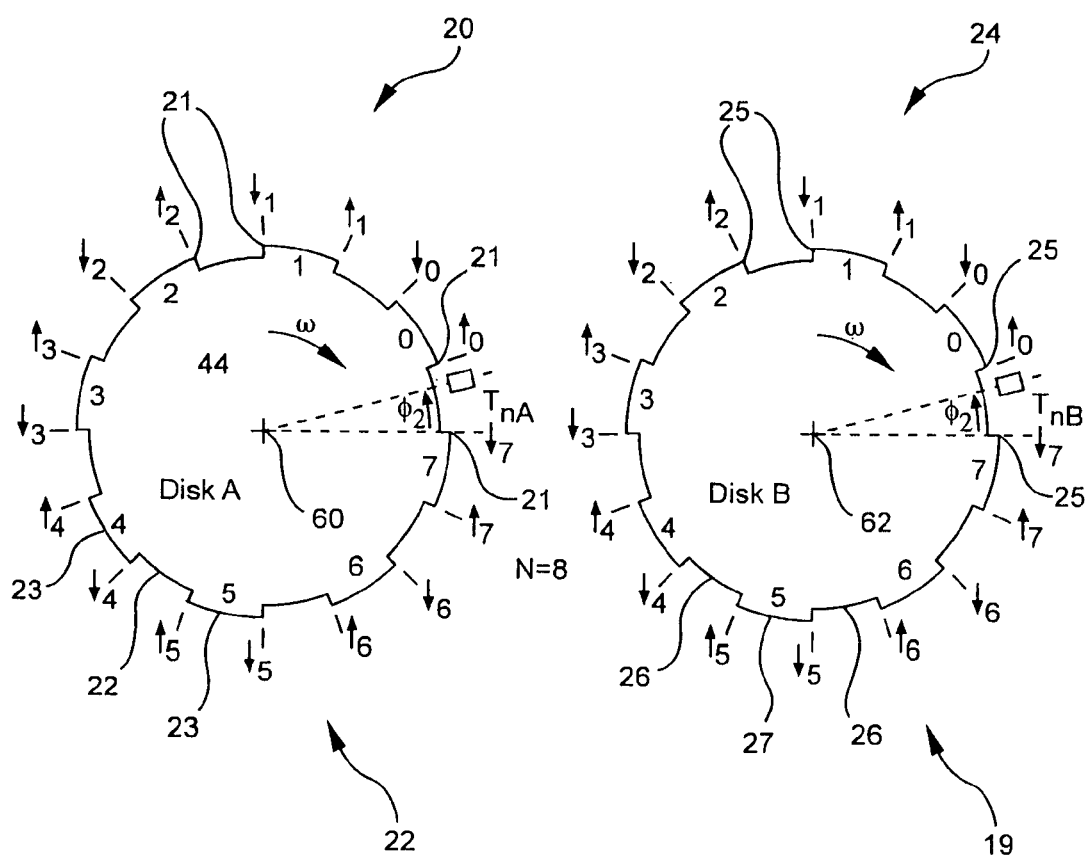
FIG. 8 shows an embodiment of the invention.
Figure 9:
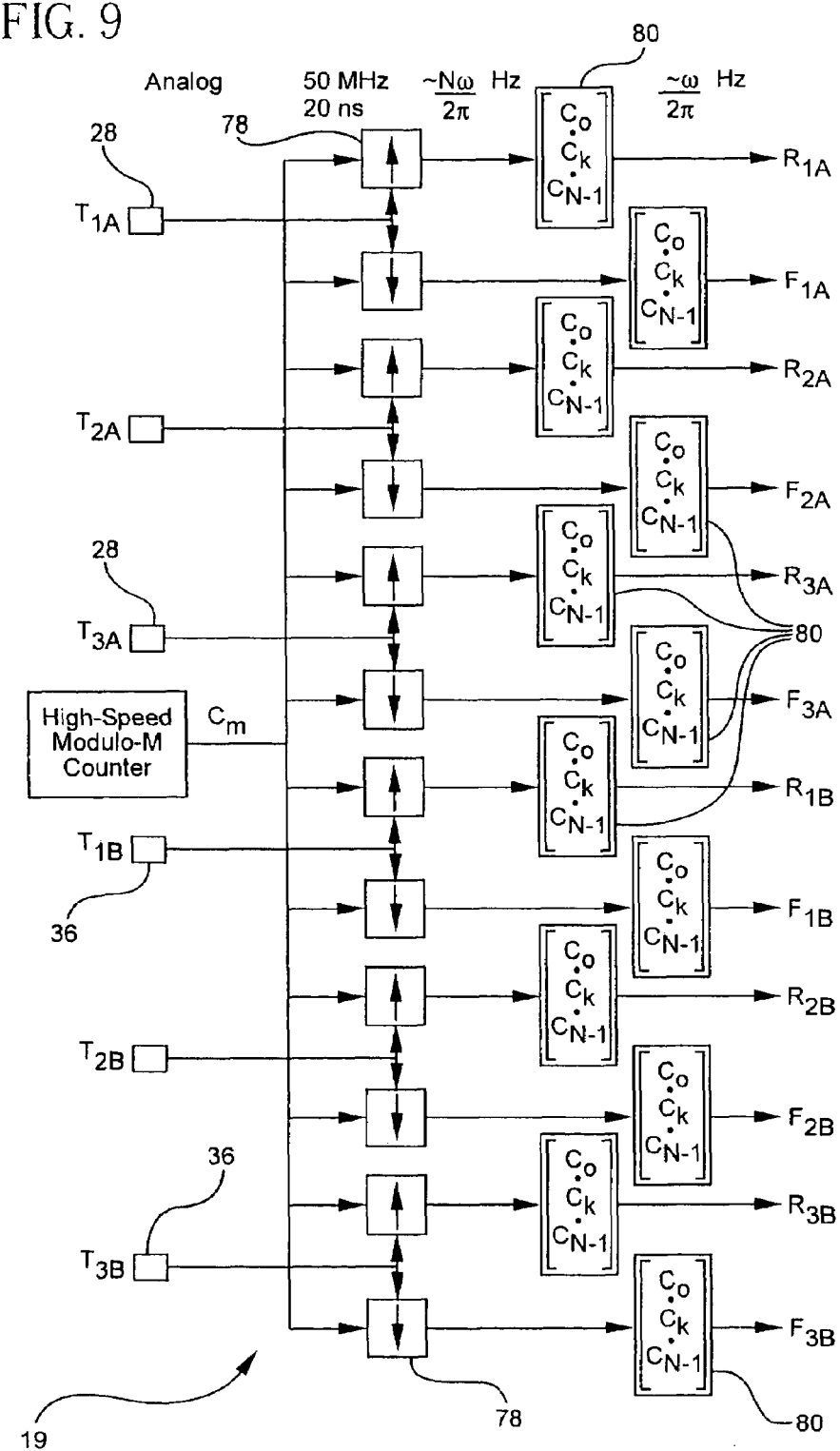
FIG. 9 illustrates a data flow embodiment of the invention.

To understand the data flow requirements, we first look at the simple example shown in FIG. 8 where the targets are raised regions at the perimeter edge of the disk. In this example, there are only N=8 target patterns around the circumference of each disk, eight raised target regions numbered 0 through 7. On Disk A the raised target regions 23 are between its target sensible lines 21. On Disk B the raised target regions 27 are between its target sensible lines 25. In practice, there are preferably more targets making up the pattern than this. Each pattern is sequentially numbered from 0 to 7. For a given sensor, each target will produce one rising edge and one falling edge as indicated in FIG. 8. There are many possible ways to sample the data required for $\Delta t$ measurement. The data flow diagram in FIG. 9 is a preferred method for processing the timing data.

The six tachometers shown in FIG. 1 produce what can be considered an analog output, even if they already contain digital threshold circuitry within the sensor. By analog, we mean that the rising or falling edge can occur at any time that is not quantized by a digital clock. The analog signals are outputted from the sensors T and inputted next into the twelve trigger blocks 78 in FIG. 9. Next in the flow diagram we have a high speed modulo-M counter driven by a high-speed digital clock that outputs high-speed count data. The high-speed count data is input to the array of twelve trigger blocks 78. These blocks 78 can be thought of as sample-and-hold devices that are triggered by the analog rising or falling edges. The average rate at which data changes at the output of the trigger blocks is completely dependent oil speed and the number of target patterns as indicated in FIG. 9. The outputs from the twelve trigger blocks 78 are inputted into twelve circular buffers 80. Although the outputs from each of the twelve trigger blocks 78 will not generally be available at the same time, we will be able to determine when a complete set (i.e. all twelve) is available associated with the $k^{th}$ target pattern. This data is stored in the twelve N-deep circular buffers 80 containing the counter value sampled at the rising and falling edges for each tachometer sensor. The circular buffers 80 will be fully refreshed after each revolution of the shaft. This vector data is shown as the output arrows of the circular buffers 80 in FIG. 9.

As long as the high-speed counter is large enough to measure the complete time interval between any two consecutive rising edges from a single tachometer sensor, then wrapping of the high-speed count due to overflow will not present difficulty.

Each circular buffer output will provide N pieces of information that will be used to generate N−1 full sets of Δt data for computing N−1 different twist and alignment measurements for each revolution. One might be tempted to employ some sort of averaging scheme here to reduce this data set even further. While this may be possible in some form, such averaging data scheme preferably utilizes analyzing experimental data from a suitable test rig. The assumptions above clearly allow for the condition where variations can occur during one complete revolution. The nature of these variations will dictate how averaging must be performed if at all. Once we analyze a full set of experimentally measured data, it will be apparent to one skilled in the art as to how we can appropriately average the data.

Using the system of FIG. 1 with the sensors T being variable reluctance sensors with all six sensors initially set with a 0.100 inch gap at 0 degree misalignment. Precision variable reluctance timing data was collected at both zero degrees and one degree of misalignment, and at speeds of 4000, 5000, 6000, and 7000 rpm. At each angular misalignment/speed condition, the load torque was swept from zero load to max load in 10% increments. Precision variable reluctance timing data was simultaneously recorded from each sensor T using a National Instruments PCI-6602 80 MHz Counter/Timer board. The twist angle was accurately predicted from the timing data. The invention provides accurate measurement of precision timing signals from non-contacting tachometer probe sensors such as variable reluctance device sensors, resulting from the passage of targets. In particular, this invention provides a method for compensating for measurement errors induced by variations in the gap between the sensor and the target. The preferred approach in the invention is to directly compensate for the errors of gap variation.

The invention is useful with non-contacting tachometer probe sensors to sense the passage of a target, where the tachometer sensor signal is corrupted due to variations in the nominal gap between the sensor and target. This invention provides a torque measurement system 19 which uses an array of six variable reluctance sensors T sensing target disk perimeter patterns of a flexible coupling 50. In a preferred embodiment the flexible coupling 50 undergoes angular misalignment up to 2.5 degrees, with significant deviations from the nominal gap common and compensated for.

The apparent angular distortion at any given sensor T is:

$$\alpha(\phi, \Delta x, \Delta y, R) = \phi - \tan^{-1}\left(\frac{\sin\phi - \left(\frac{\Delta y}{R}\right)}{\cos\phi - \left(\frac{\Delta x}{R}\right)}\right) \approx \left(\frac{\Delta y}{R}\right)\cos\phi - \left(\frac{\Delta x}{R}\right)\sin\phi \quad (A1)$$

First, we start with the condition where $\Delta x = \Delta y = 0$. If we were to measure the angle between any two sensors T on a given disk (e.g. Disk A), and we assume that the sensors have been calibrated (or physically placed) to nominally produce zero for all relative angles (modulo the tooth spacing), we would measure the following:

$$\theta_{ij} \equiv \theta_{ij}^{cal} + \omega_{shaft}\Delta t(\uparrow^i, \uparrow^j) \Rightarrow \theta_{12} = \theta_{23} = \theta_{31} = 0 \quad (A2)$$

Next, we allow a lateral offset, i.e. $\Delta x \neq 0$ and/or $\Delta y \neq 0$, then equation (2) will not hold. As described, equation (A1) can be used to predict what the measured values should be:

$$\theta_{12} = \theta_{12}^{cal} + \omega_{shaft}\Delta t(\uparrow^{1A}, \uparrow^{2A}) = \quad (A3)$$
$$\alpha(\phi_1, \Delta x_A, \Delta y_A, R) - \alpha(\phi_2, \Delta x_A, \Delta y_A, R)$$
$$\theta_{23} = \theta_{23}^{cal} + \omega_{shaft}\Delta t(\uparrow^{2A}, \uparrow^{3A}) =$$
$$\alpha(\phi_2, \Delta x_A, \Delta y_A, R) - \alpha(\phi_3, \Delta x_A, \Delta y_A, R)$$
$$\theta_{31} = \theta_{31}^{cal} + \omega_{shaft}\Delta t(\uparrow^{3A}, \uparrow^{1A}) =$$
$$\alpha(\phi_3, \Delta x_A, \Delta y_A, R) - \alpha(\phi_1, \Delta x_A, \Delta y_A, R)$$

In practice, we can use (A3) to solve for the lateral offsets based on the measured values:

$$\begin{bmatrix} (\sin\phi_2 - \sin\phi_1) & (\cos\phi_1 - \cos\phi_2) \\ (\sin\phi_3 - \sin\phi_2) & (\cos\phi_2 - \cos\phi_3) \\ (\sin\phi_1 - \sin\phi_3) & (\cos\phi_3 - \cos\phi_1) \end{bmatrix} \begin{bmatrix} \Delta x_A \\ \Delta y_A \end{bmatrix} = R \begin{bmatrix} \theta_{12}^{cal} + \omega_{shaft}\Delta t(\uparrow^{1A}, \uparrow^{2A}) \\ \theta_{23}^{cal} + \omega_{shaft}\Delta t(\uparrow^{2A}, \uparrow^{3A}) \\ \theta_{31}^{cal} + \omega_{shaft}\Delta t(\uparrow^{3A}, \uparrow^{1A}) \end{bmatrix} = R \begin{bmatrix} \theta_{12} \\ \theta_{23} \\ \theta_{31} \end{bmatrix} \quad (A4)$$

Only two of the three equations are really required to solve for the lateral offsets $\Delta x$ and $\Delta y$; however, all three may be used to compute a best least-squares estimate.

Figure 10:
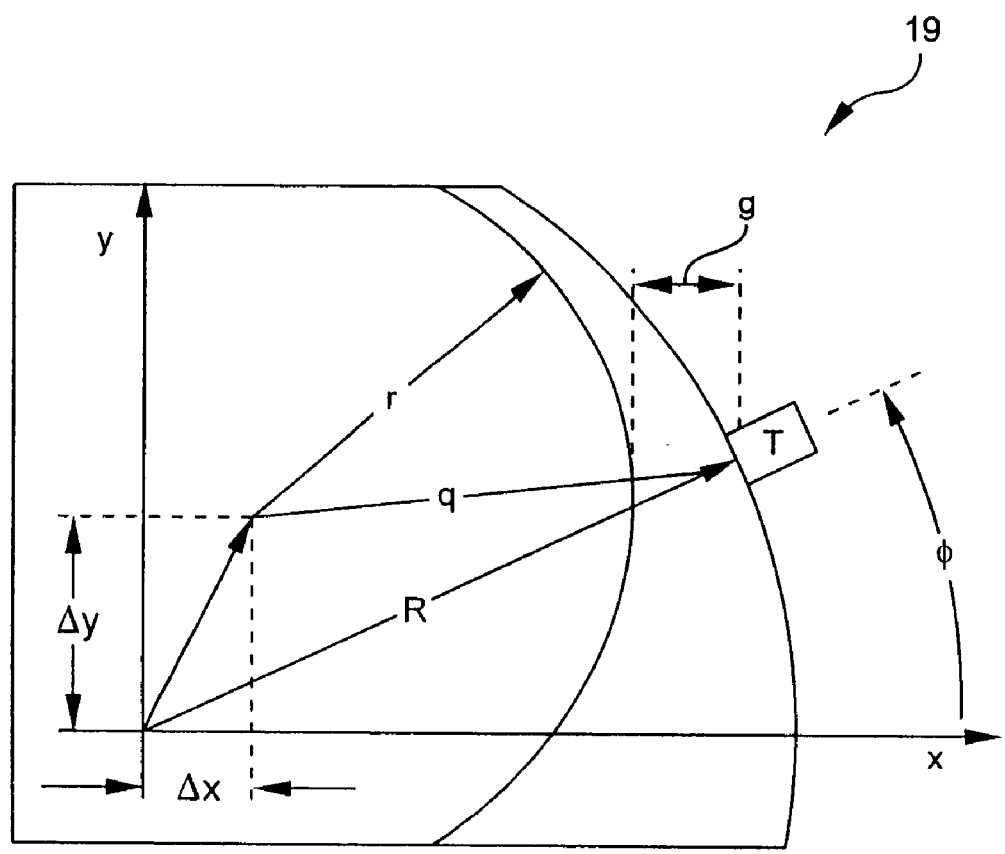
FIG. 10 shows an embodiment of the invention.

We now include the effects of gap variation at a particular sensor on the apparent angular distortion. For this analysis, we assume a linear variation in the angular distortion as a function of gap variation about the nominal gap:

$$\alpha(\phi, \Delta x, \Delta y, R, r, K) = \quad (A5)$$
$$\underbrace{\phi - \tan^{-1}\left(\frac{\sin\phi - \left(\frac{\Delta y}{R}\right)}{\cos\phi - \left(\frac{\Delta x}{R}\right)}\right)}_{\text{distortion due to lateral motion alone}} + \underbrace{K\left(\frac{\text{nominal gap}}{(R-r)} - g(\phi, \Delta x, \Delta y, R, r)\right)}_{\text{distortion due to gap variation}}$$

where R is the radius of the sensor cradle 48, r is the radius of the target disk, (R−r) is the nominal gap, and K is the sensitivity of angular distortion to gap variation. FIG. 10 shows the geometry for computing gap as a function of lateral offsets. The function g( ) represents the actual gap at a particular sensor T for a given lateral offset $\Delta x$ and $\Delta y$. Note that this gap is only a function of the lateral offsets and known constants.

From the triangle in FIG. 10, we can write the following vector equation using complex number notation:

$$Re^{j\phi} = R\cos\phi + jR\sin\phi = (\Delta x + j\Delta y) + q \quad (A6a)$$

Solving (A6a) for the unknown vector q, we have:

$$q = (R\cos\phi - \Delta x) + j(R\sin\phi - \Delta y) \quad (A6b)$$

Using (A6b), the gap is simply given by:

$$g(\phi, \Delta x, \Delta y, R, r) = \|q\| - r = \sqrt{(R\cos\phi - \Delta x)^2 + (R\sin\phi - \Delta y)^2} - r \quad (A7)$$

Equation (A7) somewhat simplifies to:

$$g(\phi, \Delta x, \Delta y, R, r) = \qquad (A8)$$

$$R\sqrt{1+\left(\frac{\Delta r}{R}\right)^2+\left(\frac{\Delta y}{R}\right)^2-2\left(\left(\frac{\Delta x}{R}\right)\cos\phi+\left(\frac{\Delta y}{R}\right)\sin\phi\right)}-r$$

Substituting (A8) back into (A5), we get:

$$\alpha(\phi, \Delta x, \Delta y, R, r, K) = \phi - \tan^{-1}\left(\frac{\sin\phi - \left(\frac{\Delta y}{R}\right)}{\cos\phi - \left(\frac{\Delta x}{R}\right)}\right) + \qquad (A9)$$

$$KR\left(1 - \sqrt{1+\left(\frac{\Delta x}{R}\right)^2+\left(\frac{\Delta y}{R}\right)^2-2\left(\left(\frac{\Delta x}{R}\right)\cos\phi+\left(\frac{\Delta y}{R}\right)\sin\phi\right)}\right)$$

Much like in the analysis above, for small displacements, equation (A8) can be approximated with the following:

$$\left(\frac{\Delta y}{R}\right) \ll 1 \text{ and } \left(\frac{\Delta x}{R}\right) \ll 1 \Rightarrow \qquad (A10)$$

$$g(\phi, \Delta x, \Delta y, R, r) \approx (R-r) - \Delta y \sin\phi - \Delta x \cos\phi$$

Substituting the approximations from (A1) and (A10) into the exact form given by equation (A9) yields the following approximation:

$$\alpha(\phi, \Delta x, \Delta y, R, r, K) = \left(\frac{\Delta y}{R} + K\Delta x\right)\cos\phi - \left(\frac{\Delta x}{R} - K\Delta y\right)\sin\phi \qquad (A11)$$

$$= \left(\frac{\cos\phi}{R} + K\sin\phi\right)\Delta y - \left(\frac{\sin\phi}{R} - K\cos\phi\right)\Delta x$$

Finally, we substitute the approximation of (A11) into equation (A3) to yield an extended version of equation (A4):

$$\begin{bmatrix} s_{21}+KRc_{12} & c_{12}+KRs_{12} \\ s_{32}+KRc_{23} & c_{23}+KRs_{23} \\ s_{13}+KRc_{31} & c_{31}+KRs_{31} \end{bmatrix} \begin{bmatrix} \Delta x_A \\ \Delta y_A \end{bmatrix} = \qquad (A12)$$

$$R\begin{bmatrix} \theta_{12}^{cal}+\omega_{shaft}\Delta t(\uparrow^{1A},\uparrow^{2A}) \\ \theta_{23}^{cal}+\omega_{shaft}\Delta t(\uparrow^{2A},\uparrow^{3A}) \\ \theta_{31}^{cal}+\omega_{shaft}\Delta t(\uparrow^{3A},\uparrow^{1A}) \end{bmatrix}$$

where $s_{ij} = \sin\phi_i - \sin\phi_j$ and $c_{ij} = \cos\phi_i - \cos\phi_j$. For K=0, equation (A12) reproduces the original result from equation (A4).

From equation (A12), we see that as practiced, this gap compensation is an augmentation of the lateral motion compensation. Using the system of FIG. 1 with the sensors T being variable reluctance sensors with all six sensors initially set with a 0.100 inch gap at 0 degree misalignment. At 7000 rpm, the alignment angle was swept from −2.25 degrees to +2.25 degrees. At each angular misalignment, precision variable reluctance timing data was simultaneously recorded from each sensor using a National Instruments PCI-6602 80 MHz Counter/Timer board.

This invention provides for measurement of angular alignment between two rotating shafts using an array of non-contacting tachometer sensor probes such as variable reluctance sensors.

The invention provides for utilizing the elements of the torque measurement system 19 to extract angular alignment information needed to process torque.

Figure 11:
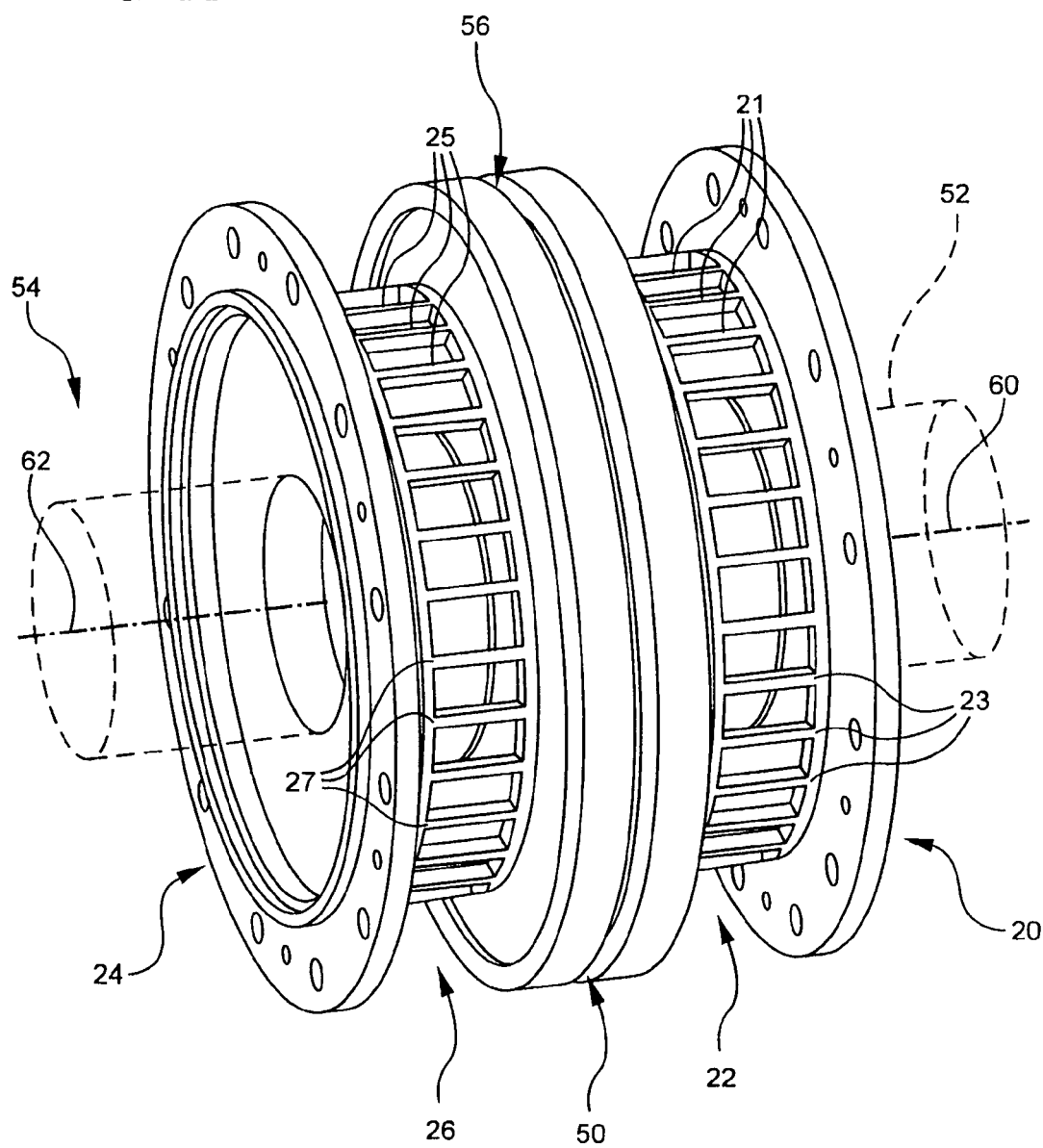
FIG. 11 shows an embodiment of the invention.

FIG. 11 shows a preferred embodiment of the invention with a flexible diaphragm coupling 50 with preferred perimeter targets 23, 27 on either side of the diaphragms embedded in each coupling flange. The targets 23, 27 are essentially gear teeth which are oriented parallel to the axis of rotation. Six variable reluctance target sensors T with three over each target disk, were used to measure the timing of gear-tooth target passage. The target disks were spinning in the x-y plane about the z-axis. Using target disks such as FIG. 11, there was no known way to determine axial (i.e. z-direction) displacements.

Figure 12:
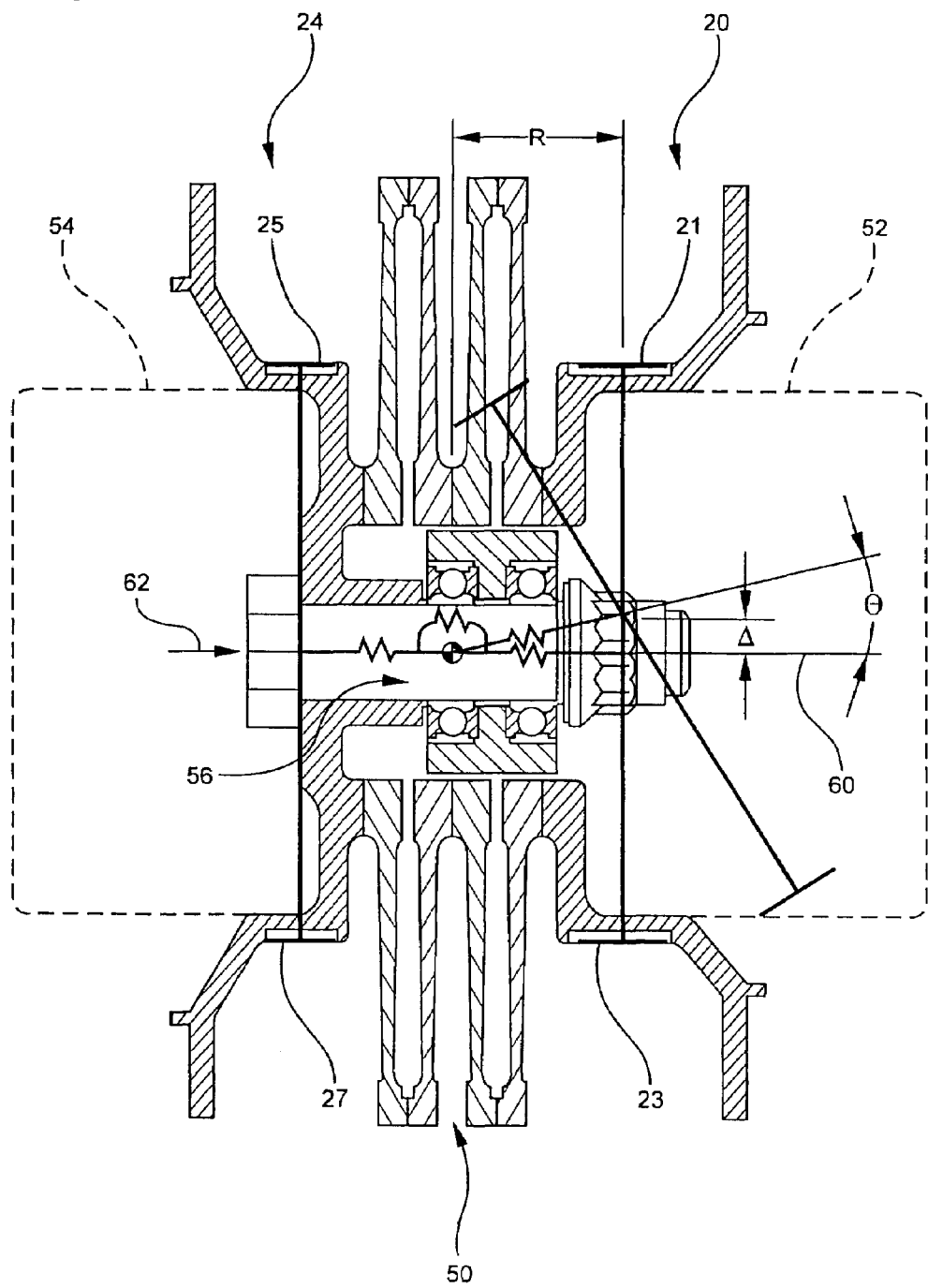
FIG. 12 shows an embodiment of the invention.

FIG. 12 illustrates flexible coupling deflections under axial misalignment of the coupling 50. The center of articulation or center of compliance or center of rotation 56 is predominantly at the geometric center of the flexible disks in the coupling as indicated in FIG. 12. For this invention we assume that the axial displacements are small, and knowing the Δx and Δy, offsets from timing measurements, it is possible to estimate the angular misalignment.

Figure 13A:
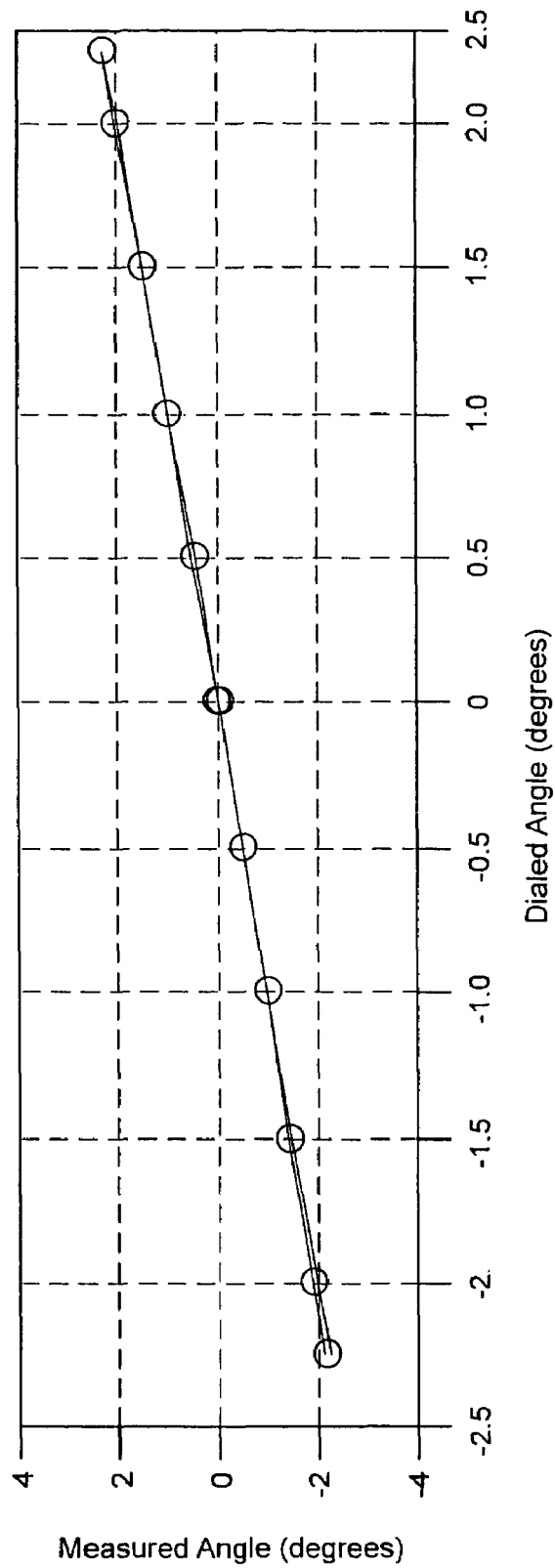
FIG. 13A illustrates performance of the invention.
Figure 13B:
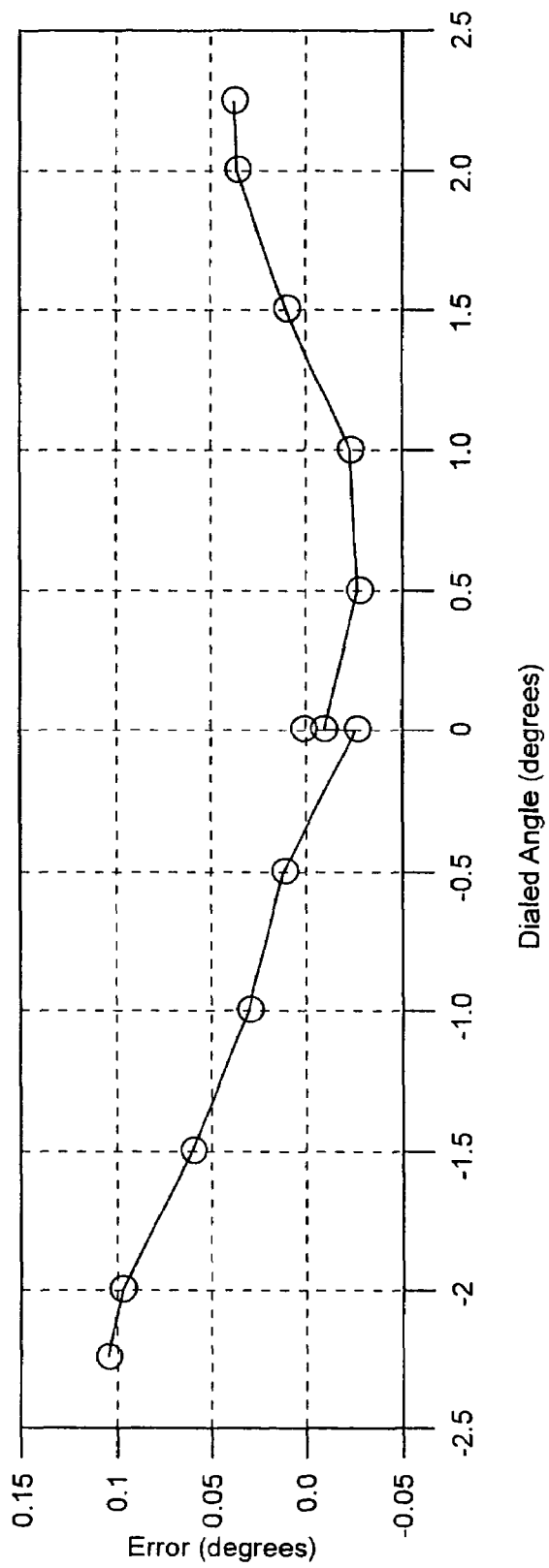
FIG. 13B illustrates performance of the invention.

Computations proceed as follows:

Compute the incremental offset between the two axes at the center of rotation of each target disk.

$$\Delta \equiv \sqrt{(\Delta x_A - \Delta x_B)^2 + (\Delta y_A - \Delta y_B)^2}$$

where subscripts A and B refer to flange Disk A and flange Disk B respectively. Note that it doesn't matter which flange Disk is labeled A and which is labeled B. Lastly, the approximate misalignment angle can be computed as $$\theta_{alignment} = \tan^{-1}\left(\frac{\Delta}{R}\right)$$

where R is the nominal distance from the center of compliance 56 to the center of the target disk. FIG. 13 illustrates the experimental verification test results showing the verification of the secondary alternative providing alignment using only the variable reluctance sensors T.

The invention provides for a torque measurement bandwidth of forty hertz. The invention provides for accurately measuring torques with a torque range of ±300,000 inch pounds, preferably in the range of about −270,900 inch pounds to +270,900 inch pounds with an rpm range of about 2,500 to 10,000 rpm, with a temperature range of about −80 to 250 degrees F.

The method for measuring twist includes providing a first rotating disk 20 (Disk A) having a target pattern 22, providing a second rotating disk 24 (Disk B) having a target pattern 26, providing a first set of at least three sensors 28 (first disk first sensor $T_{1A}$, first disk second sensor $T_{2A}$, first disk third sensor $T_{3A}$) for sensing the first rotating disk target pattern 22 and a second set of at least three sensors 36 (second disk first sensor $T_{1B}$, second disk second sensor $T_{2B}$, second disk third sensor $T_{3B}$) for sensing second rotating disk target pattern 26. The method includes measuring incremental lateral and angular displacements of the first rotating disk 20 relative to the first set of at least three sensors 28 and the second rotating disk 24 relative to second set of at least three sensors 36. The method includes measuring apparent twist of the first rotating disk 20 relative to second rotating disk 24 using the first and second sets of at least three sensors and determining the actual twist angle using the measured apparent twist, the incremental lateral displacement and the angular displacement of Disk A and B. Preferably the Disk A incremental and lateral displacement measurements are computed from relative timing measurements between the set sensors 28 of Disk A. Preferably the Disk B incremental and lateral displacement measurements are computed from relative timing measurements between sensors of set 36 of Disk B. Preferably the apparent twist measurements are computed from relative timing measurements between the sensors T of the Disk A set 28 and the Disk B set 36.

The invention includes a torque measurement system 19, comprised of a first rotating Disk A rotating about a first rotating disk center z-axis 60 with the first disk 20 oriented in an x-y plane and having a target pattern 22, and a second rotating Disk B rotating about a second rotating disk center z-axis 62 with the second disk 24 oriented in an x-y plane, and having a target pattern 26. The system 19 includes a sensor cradle 48 centered around a sensor cradle reference z-axis 64, encompassing said first rotating disk 20 and said second rotating disk 24 and including a first disk first sensor, a first disk second sensor, and a first disk third sensor fixed around and encompassing the first rotating disk 20 and positioned for sensing said first rotating disk target pattern 22, and including a second disk first sensor, a second disk second sensor, and a second disk third sensor fixed around and encompassing said second rotating disk 24 and positioned for sensing said second rotating disk target pattern 26. The first disk first sensor circumferentially positioned adjacent the second disk first sensor, the first disk second sensor circumferentially positioned adjacent the second disk second sensor, the first disk third sensor circumferentially positioned adjacent the second disk third sensor with the sensors positioned to sense a $\Delta x$ offset and a $\Delta y$ offset of first rotating disk center z-axis 60 from sensor cradle reference z-axis 64, a $\theta x$ offset and a $\theta y$ offset of first rotating disk 40 relative to sensor cradle, a $\Delta x$ offset and a $\Delta y$ offset of second rotating disk center z-axis 62 from sensor cradle reference z-axis 64, a $\theta x$ offset and a $\theta y$ offset of second rotating disk relative to sensor cradle. The system 19 provides for determination of an actual twist angle $\theta_{twist}$ between first rotating disk and the second rotating disk, preferably with the actual twist angle and a predetermined coupling compliance providing a measurement of torque.

The invention includes a torque shaft misalignment measurement system 19, comprised of a first rotating disk and shaft rotating about a first rotating center z-axis with the first disk oriented in an x-y plane, having a perimeter target pattern, a second rotating disk and shaft rotating about a second rotating center z-axis with the second disk oriented in an x-y plane, having a perimeter target pattern, first rotating shaft 52 and second rotating shaft 54 coupled together with a center of rotation 56 between first rotating disk and second rotating disk, a sensor cradle 48 centered around a sensor cradle reference z-axis 64, encompassing said first rotating disk and said second rotating disk with a first disk first sensor, a first disk second sensor, a first disk third sensor, fixed around and encompassing said first rotating disk positioned for sensing said first rotating disk target pattern, a second disk first sensor, a second disk second sensor, a second disk third sensor, fixed around and encompassing said second rotating disk, positioned for sensing said second rotating disk target pattern. The first disk first sensor is circumferentially positioned adjacent the second disk first sensor, first disk second sensor is circumferentially positioned adjacent the second disk second sensor, first disk third sensor is circumferentially positioned adjacent the second disk third sensor with the sensors positioned to sense a $\Delta x$ offset and a $\Delta y$ offset of first rotating disk center z-axis 60 from sensor cradle reference z-axis 64, a $\theta x$ offset and a $\theta y$ offset of first rotating disk relative to sensor cradle, a $\Delta x$ offset and a $\Delta y$ offset of second rotating disk center z-axis 62 from sensor cradle reference z-axis 64, a $\theta x$ offset and a $\theta y$ offset of second rotating disk relative to sensor cradle, to provide for determination of all actual twist angle $\theta_{twist}$ between first rotating disk and the second rotating disk, an incremental offset between first rotating center z-axis and second rotating center z-axis at center of rotation, an incremental angular offset between first rotating disk and second rotating disk, and provides torque and shaft misalignment measurements.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

The invention claimed is:

1. A method of measuring torque, said method comprising:
   providing a first rotating disk, said first rotating disk having a target pattern,
   providing a second rotating disk, said second rotating disk having a target pattern,
   providing a first set of at least three sensors, said first set comprised of a first disk first sensor, a first disk second sensor, a first disk third sensor, said first set of at least three sensors for sensing said first rotating disk target pattern, said first set of at least three sensors fixed around and encompassing said first rotating disk,
   providing a second set of at least three sensors, said second set comprised of a second disk first sensor, a second disk second sensor, a second disk third sensor said second set of at least three sensors for sensing said second rotating disk target pattern, said second set of at least three sensors fixed around and encompassing said second rotating disk, measuring an apparent twist of said first rotating disk relative to said second rotating disk with said first set of at least three sensors and said second set of at least three sensors, determining an actual twist angle $\theta_{twist}$ from said measured apparent twist, said method including providing a sensor cradle for fixing the position of said first set of at least three sensors and said second set of at least three sensors, with said first disk first sensor positioned adjacent said second disk first sensor, said first disk second sensor positioned adjacent said second disk second sensor, and said first disk third sensor positioned adjacent said second disk third sensor.

2. A method of measuring torque, said method comprising:
   providing a first rotating disk, said first rotating disk having a target pattern,
   providing a second rotating disk, said second rotating disk having a target pattern,
   providing a first set of at least three sensors, said first set comprised of a first disk first sensor, a first disk second sensor, a first disk third sensor, said first set of at least three sensors for sensing said first rotating disk target pattern, said first set of at least three sensors fixed around and encompassing said first rotating disk, providing a second set of at least three sensors, said second set comprised of a second disk first sensor, a second disk second sensor, a second disk third sensor said second set of at least three sensors for sensing said second rotating disk target pattern, said second set of at least three sensors fixed around and encompassing said second rotating disk, measuring an apparent twist of said first rotating disk relative to said second rotating disk with said first set of at least three sensors and said second set of at least three sensors, determining an actual twist angle $\theta_{twist}$ from said measured apparent twist, wherein providing said first rotating disk includes providing said first rotating disk with a first rotating shaft and providing said second rotating disk includes providing said second rotating disk with a second rotating shaft with said first rotating shaft and said second rotating shaft coupled together with a center of rotation between said first rotating disk and said second rotating disk, and said method includes determining an angular misalignment between said first rotating shaft and said second rotating shaft.

3. A torque measurement system, said system comprised of
a first rotating disk rotating about a first rotating disk center z-axis with the first disk oriented in an x-y plane, said first rotating disk having a target pattern,
a second rotating disk rotating about a second rotating disk center z-axis with the second disk oriented in an x-y plane, said second rotating disk having a target pattern,
a sensor cradle centered around a sensor cradle reference z-axis, said sensor cradle encompassing said first rotating disk and said second rotating disk with a first disk first sensor, a first disk second sensor, a first disk third sensor, said first disk first sensor, said first disk second sensor, and said first disk third sensor fixed around and encompassing said first rotating disk and positioned for sensing said first rotating disk target pattern, and said sensor cradle including a second disk first sensor, a second disk second sensor, a second disk third sensor, said second disk first sensor, said second disk second sensor, and said second disk third sensor fixed around and encompassing said second rotating disk and positioned for sensing said second rotating disk target pattern , said first disk first sensor positioned adjacent said second disk first sensor, said first disk second sensor positioned adjacent said second disk second sensor, and said first disk third sensor positioned adjacent said second disk third sensor with said sensors positioned to sense a $\Delta x$ offset and a $\Delta y$ offset of said first rotating disk center z-axis from said sensor cradle reference z-axis and a $\Delta x$ offset and a $\Delta y$ offset of said second rotating disk center z-axis from said sensor cradle reference z-axis to provide for determination of an actual twist angle $\theta_{twist}$ between said first rotating disk and said second rotating disk.

4. A system as claimed in claim 3, wherein said sensors are fixed in parallel alignment with said sensor cradle reference z-axis.

5. A system as claimed in claim 3, wherein said first rotating disk includes a first rotating shaft and said second rotating disk includes a second rotating shaft with said first rotating shaft and said second rotating shaft coupled together with a center of rotation between said first rotating disk and said second rotating disk.

6. A system as claimed in claim 3, wherein said first rotating disk target pattern comprises a perimeter target pattern and said second rotating disk target pattern comprises a perimeter target pattern.

7. A system as claimed in claim 3, wherein said first disk first sensor, said second disk first sensor, said first disk second sensor, said second disk second sensor, said first disk third sensor and said second disk third sensor are variable reluctance sensors.

8. A system as claimed in claim 3, wherein said first disk first sensor, said second disk first sensor, said first disk second sensor, said second disk second sensor, said first disk third sensor and said second disk third sensor are optical sensors.

9. A method of measuring a twist angle, said method comprising: providing a first rotating disk, said first rotating disk having a target pattern, providing a second rotating disk, said second rotating disk having a target pattern, providing a first set of at least three sensors, said first set comprised of a first disk first sensor, a first disk second sensor, a first disk third sensor, said first set of at least three sensors for sensing said first rotating disk target pattern, said first set of at least three sensors fixed around and encompassing said first rotating disk, providing a second set of at least three sensors, said second set comprised of a second disk first sensor, a second disk second sensor, a second disk third sensor said second set of at least three sensors for sensing said second rotating disk target pattern, said second set of at least three sensors fixed around and encompassing said second rotating disk,
measuring an apparent twist of said first rotating disk relative to said second rotating disk with said first set of at least three sensors and said second set of at least three sensors,
determining an actual twist angle $\theta_{twist}$ from said measured apparent twist, said method including providing a sensor cradle for fixing the position of said first set of at least three sensors and said second set of at least three sensors, with said first disk first sensor positioned adjacent said second disk first sensor, said first disk second sensor positioned adjacent said second disk second sensor, and said first disk third sensor positioned adjacent said second disk third sensor.

10. A method of measuring a twist angle, said method comprising: providing a first rotating disk, said first rotating disk having a target pattern, providing a second rotating disk, said second rotating disk having a target pattern, providing a first set of at least three sensors, said first set comprised of a first disk first sensor, a first disk second sensor, a first disk third sensor, said first set of at least three sensors for sensing said first rotating disk target pattern, said first set of at least three sensors fixed around and encompassing said first rotating disk, providing a second set of at least three sensors, said second set comprised of a second disk first sensor, a second disk second sensor, a second disk third sensor said second set of at least three sensors for sensing said second rotating disk target pattern, said second set of at least three sensors fixed around and encompassing said second rotating disk,
measuring an apparent twist of said first rotating disk relative to said second rotating disk with said first set of at least three sensors and said second set of at least three sensors,
determining an actual twist angle $\theta_{twist}$ from said measured apparent twist, wherein providing said first rotating disk includes providing said first rotating disk with a first rotating shaft and providing said second rotating disk includes providing said second rotating disk with a second rotating shaft with said first rotating shaft and said second rotating shaft coupled together with a center of rotation between said first rotating disk and said second rotating disk, and said method includes determining an angular misalignment between said first rotating shaft and said second rotating shaft.

* * * * *